US009990736B2

(12) United States Patent
Held et al.

(10) Patent No.: US 9,990,736 B2
(45) Date of Patent: *Jun. 5, 2018

(54) ROBUST ANYTIME TRACKING COMBINING 3D SHAPE, COLOR, AND MOTION WITH ANNEALED DYNAMIC HISTOGRAMS

(71) Applicant: The Board of Trustees of the Leland Stanford Junior University, Stanford, CA (US)

(72) Inventors: David Held, Stanford, CA (US); Jesse Levinson, Stanford, CA (US); Sebastian Thrun, Stanford, CA (US); Silvio Savarese, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/652,013

(22) Filed: Jul. 17, 2017

(65) Prior Publication Data
US 2017/0316569 A1    Nov. 2, 2017

Related U.S. Application Data

(63) Continuation of application No. 14/733,902, filed on Jun. 8, 2015, now Pat. No. 9,710,925.
(Continued)

(51) Int. Cl.
*G06T 7/277* (2017.01)
*G06T 7/207* (2017.01)

(52) U.S. Cl.
CPC .............. *G06T 7/277* (2017.01); *G06T 7/207* (2017.01); *G06T 2207/10016* (2013.01); *G06T 2207/20016* (2013.01); *G06T 2207/20076* (2013.01)

(58) Field of Classification Search
None
See application file for complete search history.

(56) References Cited

U.S. PATENT DOCUMENTS

| 5,537,118 A | * | 7/1996 | Appriou | G01S 13/726 |
|---|---|---|---|---|
| | | | | 342/95 |
| 9,710,925 B2 | | 7/2017 | Held et al. | |
| | | | (Continued) | |

OTHER PUBLICATIONS

Smith, "Reversible-Jump Markov Chain Monte Carlo Multi-Object Tracking Tutorial", http://www.kev-smith.com/tutorial/rjmcmc.php, 2011, Obtained from Parent App. 14733092.*
(Continued)

*Primary Examiner* — Matthew Bella
*Assistant Examiner* — Brian Shin
(74) *Attorney, Agent, or Firm* — KPPB LLP

(57) ABSTRACT

Velocity controllers in accordance with embodiments of the invention enable velocity estimation for tracked objects. One embodiment includes a tracker controller, including: a processor; and a memory containing: a velocity tracker application; a state space describing relationships between measured locations, calculated locations, and changes in locations, where the calculated locations in the state space correspond to unoccluded points on the surface of the tracked object; wherein the processor is configured by the velocity tracker application to: pre-process the state space to identify a tracked object; estimate a velocity of the tracked object using a location history calculated from the measured locations of the tracked object within the state space and a motion model calculated from the state space; and return the velocity of the tracked object.

20 Claims, 14 Drawing Sheets

Related U.S. Application Data

(60) Provisional application No. 62/009,238, filed on Jun. 8, 2014.

(56) References Cited

U.S. PATENT DOCUMENTS

| | | | |
|---|---|---|---|
| 2008/0219509 A1* | 9/2008 | White | A63B 24/0003 382/107 |
| 2012/0106784 A1* | 5/2012 | Cho | G06T 7/73 382/103 |
| 2014/0358960 A1* | 12/2014 | Levi | G06F 17/30495 707/769 |
| 2015/0003723 A1* | 1/2015 | Huang | G06K 9/6212 382/154 |
| 2015/0363940 A1 | 12/2015 | Held et al. | |

OTHER PUBLICATIONS

Rose. "Deterministic Annealing for Clustering, Compression, Classification, Regression, and Related Optimization Problems", Proceedings of the IEEE, vol. 86, No. 11, Nov. 1998.*
Chassis Systems Control LRR3: 3rd generation Long-Range Radar Sensor, Bosch, 2009, 2 pages.
Velodyne Lidar HDL-64E Datasheet, Mar. 2010, 2 pages.
Azim et al., "Detection, classification, and tracking of moving objects in a 3d environment", Intelligent Vehicles Symposium (IV), IEEE, Jul. 5, 2012, pp. 802-807.
Burgard, W. et al., "Integrating global position estimation and position tracking for mobile robots: the dynamic markov localization approach", Intelligent Robots and Systems, Proceedings of IEEE/RSJ International Conference on Oct. 1998, vol. 2, IEEE, pp. 730-735.
Darms, M. et al., "Classification and tracking of dynamic objects with multiple sensors for autonomous driving in urban environments", Intelligent Vehicle Symposium, IEEE, 2008, pp. 1197-1202.
Estivill-Castro et al., "Hierarchical monte-carlo localization balances precision and speed", Australasian Conference on Robotics and Automation, Jan. 2004, 10 pgs.
Feldman et al., "The multi-iterative closest point tracker: An online algorithm for tracking multiple interacting targets", Journal of Field Robotics, Jan. 10, 2012. 29(2), 258-276.
Held, D. et al., "Combining 3d shape, color, and motion for robust anytime tracking", Proceedings of Robotics: Science and Systems, Berkeley, USA, Jul. 12-16, 2014, 10 pgs.
Held, D. et al., "Precision Tracking with Sparse 3D and Dense Color 2D Data", Robotics and Automation (ICRA), IEEE International Conference on May 6-10, 2013, pp. 1138-1145.
Huang et al., "Statistics of natural images and models", Computer Vision and Pattern Recognition, IEEE Computer Society Conference on Jun. 23-25, 1999, vol. 1, pp. 541-547.
Kaestner et al., "Generative object detection and tracking in 3d range data", Robotics and Automation (ICRA), IEEE International Conference on May 14-18, 2012, pp. 3075-3081.
Konidaris et al., "Autonomous shaping: Knowledge transfer in reinforcement learning", 'Proceedings of the 23rd international conference on Machine learning', ACM, 2006, pp. 489-496.
Leonard et al., "A perception-driven autonomous urban vehicle", Journal of Field Robotics, Jul. 22, 2008, 25(10), 727-774.
Levinson et al., "Towards fully autonomous driving: Systems and algorithms", Intelligent Vehicles Symposium (IV), Jun. 5-9, 2011, IEEE, pp. 163-168.
Levinson et al., "Unsupervised calibration for multi-beam lasers", 'International Symposium on Experimental Robotics', 2010, 8 pgs.
Manz et al., "Monocular model-based 3d vehicle tracking for autonomous vehicles in unstructured environment", Robotics and Automation (ICRA), IEEE International Conference on May 9-13, 2011, pp. 2465-2471.
Mobahi et al., "Seeing through the blur", Proceedings of the IEEE Conference on Computer Vision and Pattern Recognition (CVPR) on Jun. 16-21, 2012, IEEE Computer Society, pp. 1736-1743.
Moosmann et al., "Joint self-localization and tracking of generic objects in 3d range data", IEEE International Conference on Robotics and Automation (ICRA) on May 6-10, 2013, pp. 1146-1152.
Odom et al., "Modeling multiscale differential pixel statistics", Electronic Imaging, Feb. 2, 2006, International Society for Optics and Photonics, pp. 606504-1-606504-9.
Olson, "Probabilistic self-localization for mobile robots", Robotics and Automation, IEEE Transactions on Feb. 2000, 16(1), 55-66.
Olson, "Real-time correlative scan matching", Robotics and Automation, IEEE International Conference on May 12-17, 2009, pp. 4387-4393.
Petrovskaya et al., "Model based vehicle tracking for autonomous driving in urban environments", Proceedings of Robotics: Science and Systems IV, Zurich, Switzerland, Jan. 2008, 34, 8 pgs.
Randlov et al., "Learning to drive a bicycle using reinforcement learning and shaping", Proceedings of the Fifteenth International Conference on Machine Learning, Jul. 24-27, 1998, pp. 463-471.
Restelli et al., "A robot localization method based on evidence accumulation and multi-resolution", Intelligent Robots and Systems, IEEE/RSJ International Conference on Sep. 30-Oct. 4, 2002, vol. 1, IEEE, pp. 415-420.
Rusu et al., "3d is here: Point Cloud Library (PCL)", 'IEEE International Conference on Robotics and Automation (ICRA)', Shanghai, China, May 9-13, 2011 4 pgs.
Ryde et al., "3d mapping with multi-resolution occupied voxel lists", Autonomous Robots, Feb. 2010, 28(2), 169-185.
Sheehan et al.., "Self-calibration for a 3d laser", The International Journal of Robotics Research, Apr. 2012, 31(5), 675-687.
Simmons et al., "Probabilistic robot navigation in partially observable environments", 'IJCAI', vol. 95, Jul. 1995, pp. 1080-1087.
Streller et al., "Vehicle and object models for robust tracking in traffic scenes using laser range images", Intelligent Transportation Systems, The IEEE 5th International Conference on Sep. 3-6, 2002, pp. 118-123.
Sun et al., "Image super-resolution using gradient profile prior", Computer Vision and Pattern Recognition. CVPR 2008, IEEE Conference on Jun. 23-28, 2008, pp. 1-8.
Teichman et al., "Towards 3d object recognition via classification of arbitrary object tracks", Robotics and Automation (ICRA), IEEE International Conference on May 9-13, 2011, IEEE, pp. 4034-4041.
Thrun et al., "Robust monte carlo localization for mobile robots", Artificial intelligence, May 2001, 128(1), pp. 99-141.
Wojke et al., "Moving vehicle detection and tracking in unstructured environments", Robotics and Automation (ICRA), IEEE International Conference on May 14-18, 2012, pp. 3082-3087.

* cited by examiner

```
Input  : Initial coarse tracking hypotheses H_0, initial sampling resolution g_0, desired sampling resolution g_min
Output : A set of cells c_i and probabilities p(c_i)
H_new ← H_0; g ← g_0; p(B) ← 1;
while g > g_min do
    Σ_g ← gk;
    Σ ← RΣ_x + Σ_p + Σ_g;
    /* Compute probability of velocities                          */
    for each cell c_i ∈ H_new do
        ẋ_i,j = center of cell c_i;
        Compute p(z_t | ẋ_i,j, z_{t-1}) from equation 11;
        Compute p(ẋ_i,j | z_1 ... z_{t-1}) from the motion model;
        p̂(ẋ_i,j | z_1 ... z_t) ← p(z_t | ẋ_i,j, z_{t-1}) p(ẋ_i,j | z_1 ... z_{t-1}); // Unnormalized probability
    end
    /* Normalize probabilities                                    */
    η ← Σ_{c_i ∈ H_new} p̂(ẋ_i,j | z_1 ... z_t);
    for each cell c_i ∈ H_new do
        p(c_i) ← η p̂(ẋ_i,j | z_1 ... z_t) p(B);
    end
    /* Finely sample high probability regions                     */
    H_new = ∅;
    for each cell with p(c_i) > p_min do
        Subdivide cell c_i by k along each dimension and add to H_new;
    end
    p(B) ← Σ_{c_i ∈ H_new} p(c_i);
    g ← g/k;
end
```

*FIG. 9*

ROBUST ANYTIME TRACKING COMBINING 3D SHAPE, COLOR, AND MOTION WITH ANNEALED DYNAMIC HISTOGRAMS

CROSS-REFERENCE TO RELATED APPLICATIONS

The present invention is a continuation of U.S. patent application Ser. No. 14/733,902, entitled "Robust Anytime Tracking Combining 3D Shape, Color, and Motion with Annealed Dynamic Histograms" to Held et al., filed Jun. 8, 2015, which claims priority to U.S. Provisional Application No. 62/009,238 entitled "Method and System for Combining 3D Shape. Color, and Motion for Robust Anytime Tracking" to Held et al., filed Jun. 8, 2014. The disclosures of which are herein incorporated by reference in their entirety.

STATEMENT OF FEDERALLY SPONSORED RESEARCH

This invention was made with Government support under N00014-07-1-0747 awarded by ONR, W911NF-10-2-0059 awarded by the U.S. Army, and N00014-10-1-0933 awarded by ONR. The Government has certain rights in this invention.

FIELD OF THE INVENTION

The present invention relates generally to machine vision systems and more specifically to systems and methods for tracking objects.

BACKGROUND

As computers evolve, they can interact with their environment in increasingly complex ways. For example, cameras can send one or more video streams of data to a computer. These streams of data contain a myriad of information that can be further processed and used for many areas of computing including (but not limited to) object tracking, path planning, pattern recognition, scene reconstruction, object pose estimation, and image restoration.

Object tracking can require a computer (or robot) to locate a moving object and estimate its velocity in an environment. The object can be tracked by finding the same object in subsequent video frames. Real time object tracking can require this process to occur at high speeds. Real time systems generally aim to provide a response within a specified amount of time to enable a computer to react to changes in the environment as soon as they occur. In general, robotics applications including autonomous vehicles utilize perception systems that are real time because a car accident can occur if a car fails to make quick decisions.

SUMMARY OF THE INVENTION

Velocity controllers in accordance with embodiments of the invention enable velocity estimation for tracked objects. One embodiment includes a tracker controller, including: a processor; and a memory containing: a velocity tracker application; a state space describing relationships between measured locations, calculated locations, and changes in locations, where the calculated locations in the state space correspond to unoccluded points on the surface of the tracked object; wherein the processor is configured by the velocity tracker application to: pre-process the state space to identify a tracked object; estimate a velocity of the tracked object using a location history calculated from the measured locations of the tracked object within the state space and a motion model calculated from the state space; and return the velocity of the tracked object.

In a further embodiment, changes in locations in the state space are measures of changes in position relative to a last observation.

In another embodiment, the state space further comprises three-dimensional information.

In a still further embodiment, the state space further comprises two-dimensional information.

In still another embodiment, the state space further comprises a Dynamic Bayesian Network.

In a yet further embodiment, the measured locations in the Dynamic Bayesian Network are independent of previous measured locations and velocities and the changes in locations in the Dynamic Bayesian Network are measures of changes in position relative to a last observation.

In yet another embodiment, pre-processing the state space further comprises a point-cloud based segmentation process.

In a further embodiment again, estimating a velocity of a tracked object using the location history and the motion model further comprises an annealed dynamic histogram (ADH) process.

In another embodiment again, the ADH process further comprises: dividing the state space into a grid of cells where the grid of cells comprises a plurality of cells; calculating a probability that the tracked object is located in a given cell with respect to each cell in the plurality of cells; subdividing each cell in the plurality of cells having a probability that the tracked object is within the cell that satisfies a threshold into a plurality of subdivided cells; updating the grid of cells with the plurality of subdivided cells; and return the grid of cells and the probability that the tracked object is within each of the cells in the plurality of cells.

In a further additional embodiment, the ADH process is adaptable based upon a desired runtime and a desired tracking resolution.

In another additional embodiment, the probability that the tracked object is in a given cell is evaluated using the location history.

In a still yet further embodiment, the location history is evaluated using the following expression:

$$p(z_t \mid x_t, z_{t-1}) = \eta \left( \prod_{z_j \in z_t} \exp\left(-\frac{1}{2}(z_j - \bar{z}_i)^T \Sigma^{-1}(z_j - \bar{z}_i)\right) + k \right)$$

where t, i, and j indicate positions in the state space, z is the measured location, x is the change in location, and η is a constant, and k is a smoothing term.

In still yet another embodiment, the location history further comprises optional color channel information and is evaluated using the following expression:

$$p(z_t \mid x_t, z_{t-1}) = \\ \eta \left( \prod_{z_j \in z_t} p_s(z_j \mid x_t, z_{t-1}) p_c(z_j \mid x_t, z_{t-1}, V) + k_3(k_4 - p_s(z_j \mid x_t, z_{t-1})) \right)$$

where t, i, and j indicate positions in the state space, z is the measured location, x is the change in location, and η is a constant, k is a smoothing term, $p_s$ is the probability of a spatial match, $p_c$ is the probability of a color match, and p(V) is the prior probability of sampling from a previously visible surface.

In a still further embodiment again, the probability that the tracked object is in a given cell is evaluated using the motion model.

In still another embodiment again, the motion model is evaluated using the following expression: $p(\hat{x}_{t,i}|z_1 \ldots z_{t-1})$, where t and i indicate positions in the state space, z is the measured location, x is the change in location.

Another further embodiment of the method of the invention includes: the threshold is determined by a KL-divergence.

Still another further embodiment of the method of the invention includes: a number of the plurality of subdivided cells is evaluated using the following expression: $k=3^d$, where d is the number of dimensions.

In further embodiment, the measurement model is evaluated using a kd-tree for the nearest-neighbor for each point.

In another embodiment, the measurement model is evaluated using a pre-caching process to pre-cache the probability that a tracked object is within a cell in the plurality of cells.

In a still further embodiment, the measured locations compares two frames with a smaller and a larger set of points by tracking from the frame with the smaller set of points to the frame with the larger set of points.

In still yet another embodiment, the measurement model is evaluated using a combination of a kd-tree for the nearest-neighbor for each point and a pre-caching process to pre-cache the probability that a tracked object is within a cell in the plurality of cells.

BRIEF DESCRIPTION OF THE DRAWINGS

FIG. 9 is pseudocode illustrating a process for using annealed dynamic histograms to estimate velocity of tracked objects in accordance with an embodiment of the invention.

DETAILED DESCRIPTION

Figure 1B:
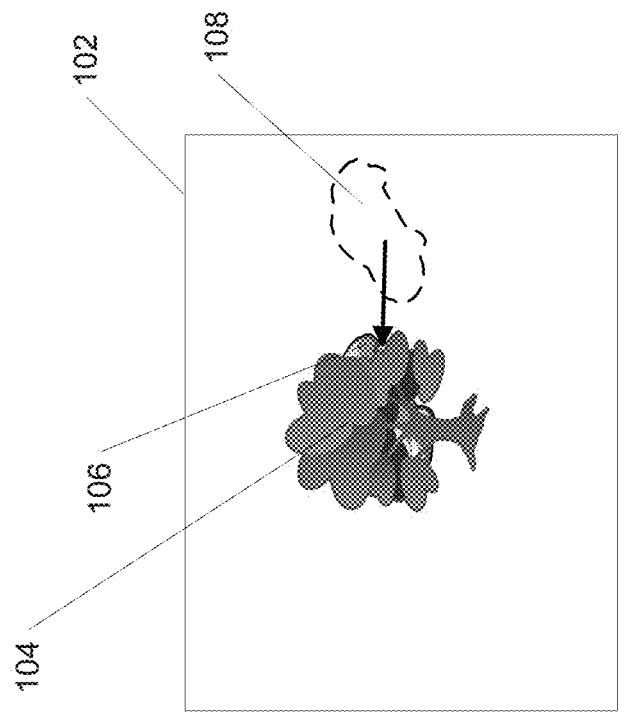
FIG. 1B is a diagram conceptually illustrating a scene captured by a camera at a second time where an object has become partially occluded.

Turning now to the drawings, systems and methods for estimating velocities of tracked objects using location history and motion models in accordance with embodiments of the invention are illustrated. Real time object tracking can be a complex problem involving a number of challenges including (but not limited to) changes in viewpoint of the camera, occlusions, and/or lighting variations. In addition, objects being tracked may not be uniform and can have differences such as varied shape, varied size, and/or varied distance from the camera. Occlusions can occur when all or part of a tracked object moves behind another object out of the field of view of the camera. In general, changes in viewpoint, occlusions, and/or lighting variations, as well as nonuniform tracked objects can generate noise in real time object tracking calculations. Tracking three dimensional (3D) objects can decrease this noise.

To track a 3D shape, real time object trackers in accordance with many embodiments of the invention can form a model of the tracked objects. One method to model tracked objects is a Bayesian probabilistic framework using a Dynamic Bayesian Network, which can combine 3D shape information with motion data and other optional channels of information. These optional channels of information can include color channels and/or depth information. Color channels can be made up of individual and/or several color channels from various color models including RGB (red green blue), CMYK (cyan magenta yellow black), or HSV (hue saturation value). Additional channels can include (but are not limited to) channels providing depth information, and confidence information related to depth estimates. In various embodiments depth information can be obtained from any of a variety of depth sensors including (but not limited to) multiview stereo cameras, time of flight cameras, structured illumination systems, and/or Light Detection and Ranging (LIDAR) systems.

In various embodiments, 3D shape information in the Dynamic Bayesian Network model can include both a calculated surface of the 3D object and sensor measurements of the object. These values can be different because of inherent noise in sensor measurements, and the use of both values can decrease some of the effects of the sensor noise on real time object tracking velocity calculations. Additionally, a measurement model can be calculated from the Dynamic Bayesian Network model. This measurement model can provide location history of objects and the probability an object will be measured at a given location based on that location history. In various embodiments, a motion model, which can include velocity information, can also be incorporated into the real time object tracker.

Objects can be segmented from the background as a pre-processing step using various methods. In some embodiments, a point-cloud based segmentation can be used to generate segmented objects within the Dynamic Bayesian Network model. The model can then be coarsely divided and subsections can be sampled at a higher resolution to globally explore the space in real time. In many embodiments, an annealed dynamic histograms (ADH) approach can be used, which can quickly return coarse velocity values when optimized for speed, or be allowed to iterate over time and can return more accurate velocity values as the system or method requires.

Systems and methods for performing velocity estimation of tracked objects in real time and solutions to a velocity estimation real time object tracking problem that can be utilized in the implementation of such systems and methods in accordance with embodiments of the invention are discussed further below.

Tracking Objects with Varying Appearance Between Successive Frames

Many robotics applications are limited in what they can achieve due to unreliable tracking estimates. For example, an autonomous vehicle driving past a row of parked cars should know if one of these cars is about to pull out into the lane. Many object tracking processes in current use provide noisy estimates of the velocity of these vehicles, which are difficult to track due to heavy occlusion and viewpoint changes. Additionally, without robust estimates of the velocity estimates of the velocity of nearby vehicles, merging onto or off highways or changing lanes become formidable tasks. Similar issues are encountered by any robot that operates autonomously in crowded, dynamic environments.

Figure 1A:
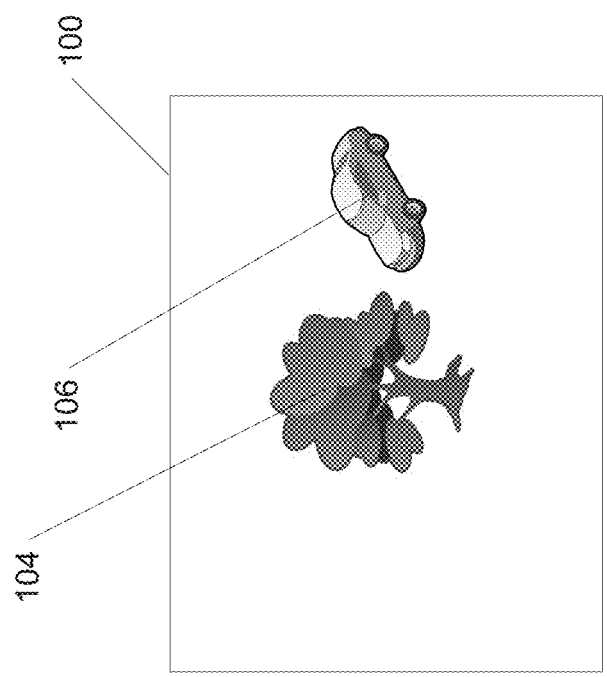
FIG. 1A is a diagram conceptually illustrating a scene captured by a camera at a first time.

The challenge presented to object trackers by occlusions and/or viewpoint changes when performing object tracking is conceptually illustrated in FIGS. 1A and 1B. An image 100 of a scene captured by a camera at a first time is illustrated in FIG. 1A. Image 100 contains a car 106 to the right of tree 104. The same scene captured by a camera at a second time is illustrated in FIG. 1B. An image 102 is captured by the camera of the scene at a second time. Image 102 contains the same tree 104 and car 106, but the location of car 106 has changed. The car has moved to the left from previous position 108 and is now partially occluded and located behind tree 104. As can readily be appreciated, the presence of the tree 104 occluding the car 106 in the image 102 changes the appearance of the car. In real world scenarios, additional changes in appearance may result from a shift in the viewpoint of the camera and/or rotation of the car relative to the camera.

The velocity of the tracked car can be determined by identifying a common point on the car in each of the two captures images 100, 102 and determining the motion of the image during the elapsed time. In many systems, a common point is selected by determining the centroid of the group of pixels constituting the object in each of the images. When the appearance of the object changes between images, then the centroid that is determined during the velocity estimation process will be in different locations relative to the 3D shape of the object in each image. The differences in the placement of the centroid relative to the 3D shape of the object in each image introduce a source of error in the velocity measurement. As discussed further below, systems and methods in accordance with various embodiments of the invention determine velocity accounting for variation in the appearance of an object based upon factors including (but not limited to) occlusion and/or changing viewpoint. In many embodiments, a motion model is utilized that determines the probability of a specific motion given observed points associated with the surface of a 3D object. In several embodiments, the probability of an observed motion considers the probability of correspondence between observed points visible in successive images of a scene. Various motion models that can be utilized in accordance with embodiments of the invention are discussed further below.

As can readily be appreciated, the tree shown in FIGS. 1A and 1B is merely an illustrative example of the type of object that may cause an occlusion and many objects can provide occlusions in autonomous vehicles applications such as (but not limited to) utility poles, street signs, other cars, and/or buildings. Additionally, many moving objects can become occluded including (but not limited to) people, animals, bikes, and/or trains. In some embodiments, stationary objects can become occluded due to a change in viewpoint. This can occur when a camera is mounted on a moving object and the motion of the camera causes an occlusion of an object relative to the camera. Furthermore, occlusions can be caused when both an object and a camera are both moving and the object becomes occluded. Additionally, self-occlusions can occur when the entire surface of an object is not visible from a single position of a camera, for example when only one side of an object is visible but the back side (relative to the camera) is not visible. Before discussing the specifics of the processes utilized to perform object tracking in ways that account for occlusions and/or viewpoint changes, we provide an overview of the robotic computing platform and software architectures that can be utilized to implement perception systems containing object trackers in accordance with various embodiments of the invention. Robotic software architectures, including software architectures that can be utilized in autonomous vehicles, are discussed further below.

Robotic Software Architectures

Figure 2:
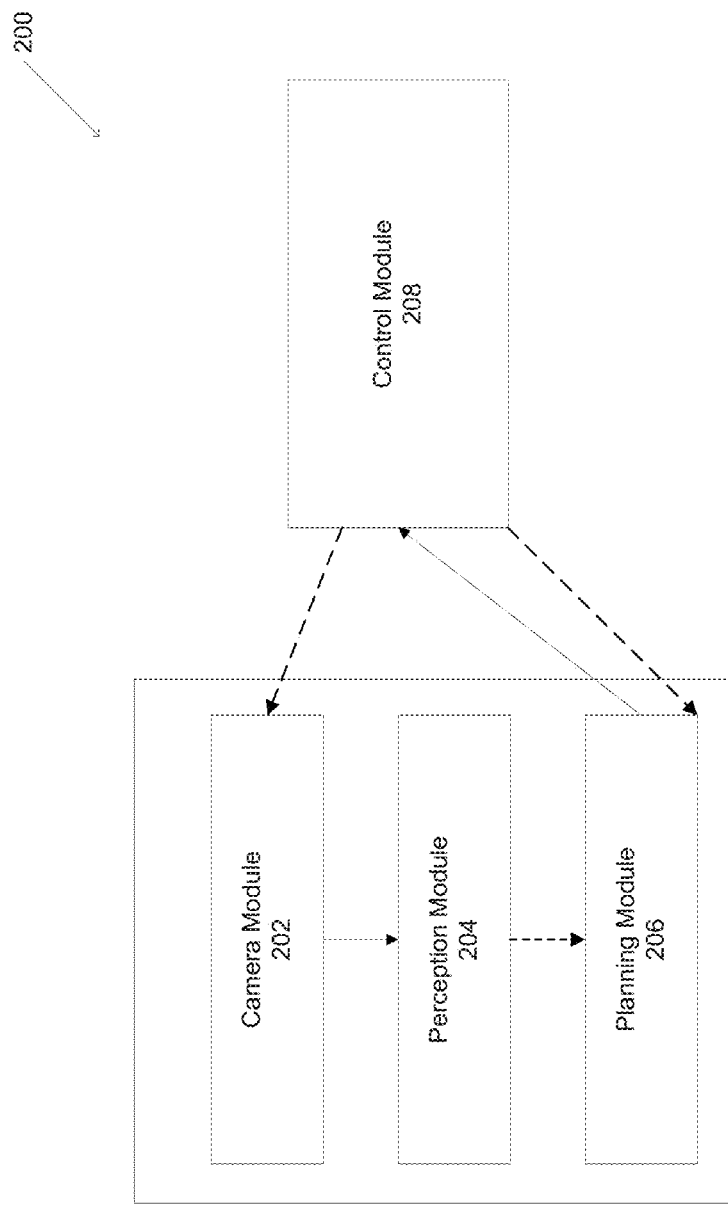
FIG. 2 is a block diagram of autonomous vehicle software architecture in accordance with an embodiment of the invention.

A software architecture that can be utilized in an autonomous vehicle is illustrated in FIG. 2. The autonomous vehicle architecture 200 includes camera module 202, perception module 204, planning module 206, and control module 208. Camera module 202 can capture scene information similar to a scene described with reference to FIGS. 1A-1B and passes this information to the perception module. Perception module 204 can take scene information and produce a 3D state space and/or estimate velocities of objects tracked in a 3D state space. In many embodiments, the perception module 204 includes a 3D state space that contains objects modeled in a way similar to a Dynamic Bayesian Network as described below with reference to FIG. 5. The 3D state space and estimated velocities of tracked objects can be passed to planning module 206 by the perception module, where this information can be used for path planning for the autonomous vehicle. This path planning information can be passed to control module 208. The control module can execute path planning commands as well as send vehicle state and control information to the camera module 202 and planning module 206. Although a software architecture capturing information with a camera and utilizing the estimated velocity information for autonomous vehicle path planning is described with reference to FIG. 2, any of a variety of software architectures for estimating object velocity from estimated scene information can be utilized as appropriate of specific computing applications in accordance with embodiments of the invention. Tracker controllers that are utilized to track objects and estimate object velocities in accordance with various embodiments of the invention are discussed below.

Tracker Controllers

Figure 3:
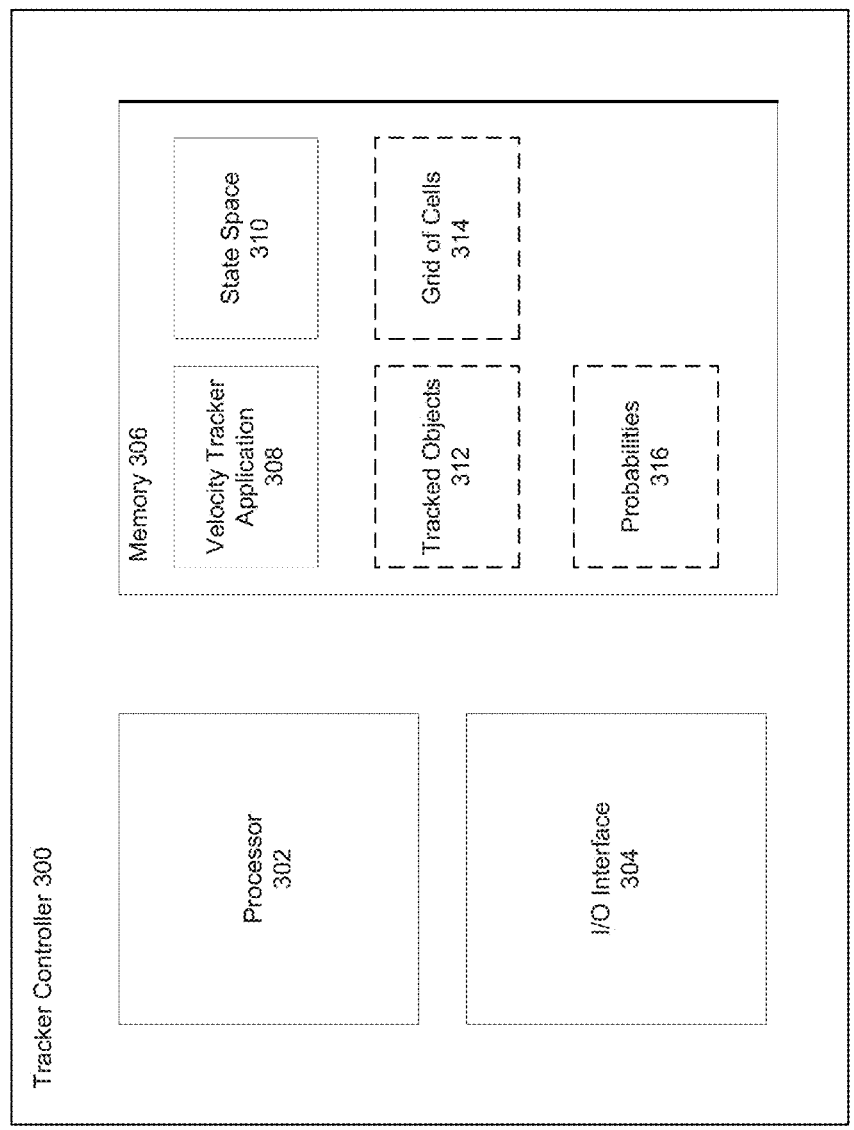
FIG. 3 is a block diagram of a tracker controller in accordance with an embodiment of the invention.

A tracker controller in accordance with an embodiment of the invention is shown in FIG. 3. In several embodiments, tracker controller 300 can perform calculations using one or more real time object tracking systems to determine velocities of tracked objects. In the illustrated embodiment, the tracker controller includes at least one processor 302, an I/O interface 304, and a memory 306. The at least one processor 302, when configured by software stored in memory, can perform calculations on data passing through the I/O interface as well as data stored in memory. In many embodiments, I/O interface 204 can enable receipt of data from a variety of sensor systems including (but is not limited to) a monochrome camera, a color camera, a near-IR camera, odometry sensors, intertial measurement units and/or depth sensors including (but not limited to) multiview stereo cameras, time of flight cameras, structured illumination systems, and/or LIDAR systems. Memory 306 can include software including a velocity tracker application 308 as well as storage for parameters including state space 310, tracked objects 312, a grid of cells 314, and probabilities 316. The tracker controller can use the state space to find the locations of tracked objects by creating a grid of cells within the state space and calculating the probabilities for those tracked objects as described in further detail below. The velocity tracker application 308 will also be discussed in greater detail below and can enable a computing system to perform calculations to solve for velocities of tracked objects.

Although a number of different tracking controllers are described above with respect to FIG. 3, any of a variety of computing systems capable of performing real time object tracking can be utilized as appropriate to the requirements of specific applications in accordance with various embodiments of the invention. Processes that can be utilized to estimate velocities for tracked objects in accordance with various embodiments of the invention will now be discussed in detail below.

Tracking Pipeline

Figure 4:
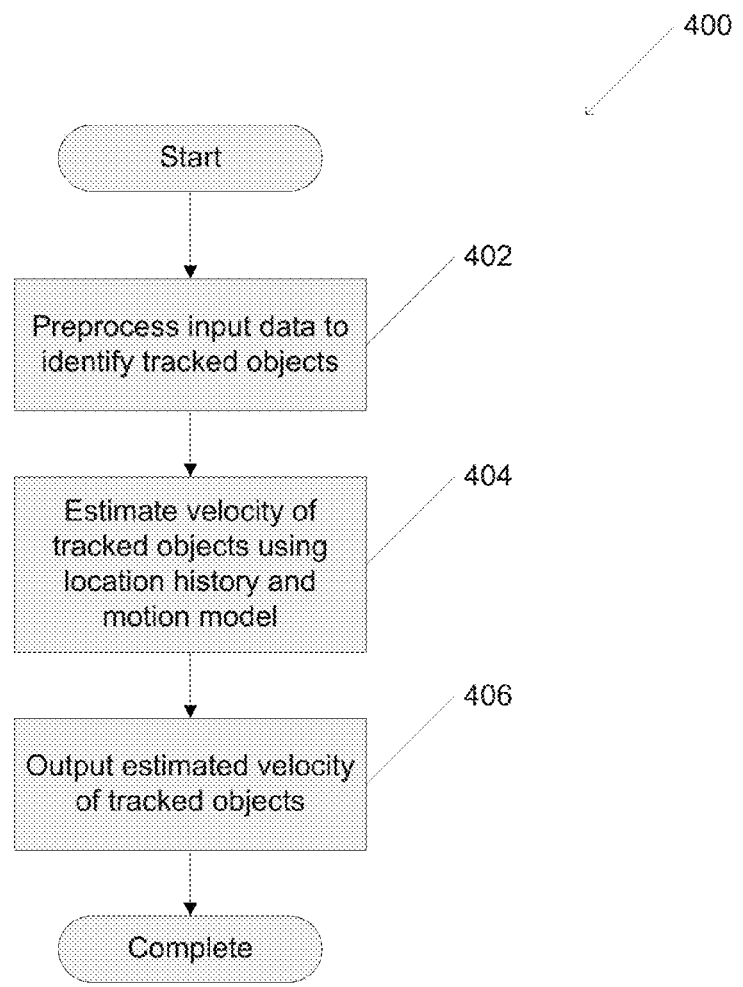
FIG. 4 is a flow chart illustrating a process for estimating velocities for tracked objects in accordance with an embodiment of the invention.

A process that can be performed by a tracker controller to estimate velocities for tracked objects in accordance with an embodiment of the invention is illustrated in FIG. 4. The process 400 includes pre-processing input data to identify 402 tracked objects. Pre-processing is discussed further below. Velocity can be estimated 404 using location history and a motion model of the tracked objects. In some embodiments, velocity can be estimated in a manner similar to pseudocode for a process for annealed histogram distribution as described with respect to FIG. 9 below. The estimated velocity of the tracked objects can be returned 406 to a tracker controller. As discussed in greater detail below, the estimated velocity can be returned to the tracker controller as a mean, mode, and/or entire velocity distribution as requirements as appropriate to the requirements of specific applications. Although various processes for estimating velocities of tracked objects using location history and a motion model are described above with reference to FIG. 4, many different techniques can be utilized for performing velocity estimation can be utilized in accordance with numerous embodiments of the invention.

In many embodiments, a point-cloud based segmentation and data association algorithm can be used as a pre-processing step, which can segment objects from the background into clusters and associate these object clusters between successive time frames. The tracking method can then estimate the velocity of each of the pre-segmented tracked objects. The annealed dynamic histograms technique, which is described in detail further below, can globally explore the search space in real-time. The state space is sampled with a coarse grid, and for each sample, the probability of the state using a measurement model can be calculated. The grid of cells can then subdivided to refine the distribution. Over time, the distribution becomes increasingly accurate. After the desired runtime or tracking resolution, the tracker can be stopped, at which point the current posterior distribution over velocities can be returned.

State Space

In various embodiments, a probabilistic model can be used for tracking. As described below, this model can be used as part of an annealed dynamic histogram framework. $x_t$ is a state variable which can be defined as $x_t = (x_{t,p}, \dot{x}_t)$, where $x_{t,p}$ can be a linear position and $\dot{x}_t$ can be a velocity of a tracked object. Since object tracking can estimate the motion of objects, the position state variable $x_{t,p}$ can measure the change in position relative to the last observation. To achieve this, in some embodiments, after each observation the origin of the coordinate system can be set to a location at the centroid of the previous observation. The position state variable thus measures how far this object has moved since the previous observation.

In many embodiments, the rotational velocity of the tracked object is small relative to the frame rate of the sensor. This is often the case for people, bikes, and cars moving in urban settings. Thus, the rotational velocity is not included in the state. In various embodiments, the rotational velocity can be estimated in many ways, including by obtaining the posterior over translation and searching for the optimal rotation as described further below.

Models can be general and can be used to track objects moving in three dimensions. In many embodiments, however, objects of interest (people, bikes, and/or cars) are generally confined to the ground surface. Thus, to speed up the method, tracked objects in some embodiments exhibit minimal vertical motion within the frame rate of the sensor. In a number of embodiments, therefore, the state space can be limited to only model motion along the ground surface, which can result in a significant processing speedup, with minimal effect on accuracy. In other embodiments such as (but not limited to) drones and other flying robots, no assumptions are made with respect to objects of interest having constrained motion. In various embodiments, moving objects can be tracked vertically by appending the vertical dimension to the state space, which can result in a slightly slower method. Alternatively, an elevation map can be incorporated to predict vertical motion due to elevation changes. The specific motion model utilized when performing motion tracking typically depends upon the requirements of a given application.

Dynamic Bayesian Network

Figure 5:
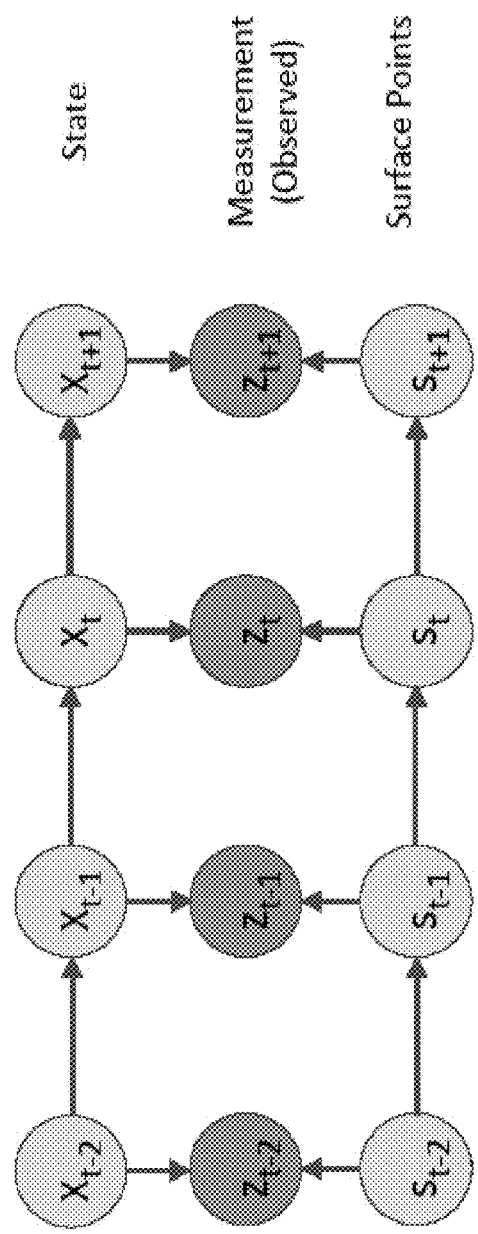
FIG. 5 is a diagram illustrating a Dynamic Bayesian Network in accordance with an embodiment of the invention.

A Dynamic Bayesian Network upon which a motion model can be built for use in object tracking in accordance with an embodiment of the invention is shown in FIG. 5. A Bayesian probabilistic framework can be used to combine 3D shape, motion and other channels of information such as (but not limited to) color. The model can include a latent surface variable $s_t$, which corresponds to a set of points sampled from the visible surface of the tracked object. The latent surface variable $s_t$ enables incorporation of the 3D shape of objects into the tracker. Without this term, the measurement $z_t$ would be independent of the previous measurement $z_{t-1}$ conditioned on the state $x_t$. In many embodiments, this can be false if the measurement includes the 3D shape of a tracked object, which can stay relatively consistent from one time step to the next. Indeed, this independence assumption would prevent comparison of 3D measurements of current and past observations for tracking.

The latent surface variable $s_t$ is related to similar notions in other systems. For example, some systems include a geometry variable in which they model objects as 2D rectangles and estimate their width and length. SLAM systems use a similar variable to represent the environment map. Both of these methods attempt to explicitly model the geometry of the tracked object or environment. In contrast, various embodiments of the present invention may not explicitly model the object's shape, but can integrate over shapes and focus on estimating the target object's velocity.

The latent surface variable $s_t$ can be represented as a collection of n points $\{s_{t,1} \ldots s_{t,n}\} \in s_t$ sampled from the visible surface of the tracked object at time t. The prior $p(s_t)$ on these points can be a uniform distribution over the maximum size of a tracked object. This prior can decompose as a product of the priors for each point in $s_t$, i.e. $p(s_t) = \Pi_j p(s_{t,j})$.

In several embodiments, the measurement $z_t$ can represent the set of n observed points at time t, $\{z_{t,1} \ldots z_{t,n}\} \in z_t$. Each measurement $z_{t,j}$ can be drawn from a corresponding latent surface point $s_{t,j}$. Because of sensor noise, the observed measurements $z_t$ will not lie exactly on the object surface and hence will not be exactly equal to $s_t$. The observed points $z_t$ can be generated from the latent surface $s_t$ and the state $x_t$ via the following procedure: for each latent surface point $s_{t,j}$, Gaussian noise can be added based on the sensor resolution $\Sigma_e$ to create a noisy point $\tilde{s}_{t,j}$. The point $\tilde{s}_{t,j}$ can be shifted according to the current object position $x_{t,p}$ to generate the measurement $z_{t,j}$ at the appropriate location. Therefore, each measurement $z_{t,j}$ can be written as:

$$z_{t,j} \sim \mathcal{N}(s_{t,j}, \Sigma_e) + x_{t,p}. \quad (1)$$

The previous measurements $z_{t-1}$ can be centered on the origin of the coordinate system. The points in $z_{t-1}$ can be noisy observations of the previous surface $s_{t-1}$. Therefore, for each point $z_{t-1,i} \in z_{t-1}$ from the previous observation:

$$z_{t-1,i} \sim \mathcal{N}(s_{t-1,i}, \Sigma_e). \quad (2)$$

In various embodiments, an additional conditional independence assumption can be created which is not encoded in the graphical model:

$$p(z_{t-1}|x_t, s_{t-1}) = p(z_{t-1}|s_{t-1}). \quad (3)$$

where $p(s_t|s_{t-1})$ can represent the probability of sampling points $s_t$ from the currently visible object surface given the previously sampled points $s_{t-1}$. The sampled points may have changed due to occlusions, viewpoint changes, deformations, and random sampling. Additionally, in some embodiments, every point $s_{t,j} \in s_t$ could have either been generated from a previously visible portion of the object surface at time t−1 or from a previously occluded portion. If $p(V)$ represents the prior probability of sampling from a previously visible surface, then:

$$p(s_{t,j}|s_{t-1}) = p(V)p(s_{t,j}|s_{t-1},V) + p(\neg V)p(s_{t,j}|s_{t-1},\neg V) \quad (4)$$

$p(s_{t,j}|s_{t-1},V)$ can be modeled as a Gaussian, $s_{t,j} \sim \mathcal{N}(s_{t-1,i}, \Sigma_r)$ where $\Sigma_r$ can model the variance resulting from the sensor resolution as well as from object deformations, and $s_{t-1,i}$ can be the nearest corresponding (latent) surface point from the previous frame. The sensor resolution can change as a function of distance, and $\Sigma_r$ can be calculated accordingly for each tracked object.

The probability that $s_{t,j}$ is generated given that the surface from which it is sampled was previously occluded can be represented by $p(s_{t,j}|s_{t-1}, \neg V)$. In numerous embodiments, an occlusion model for the previous frame can be used to calculate this probability. Otherwise, in many embodiments, any region that was not previously visible can be assumed to be previously occluded. This can be generically written as:

$$p(s_{t,j}|s_{t-1}, \neg V) = k_1(k_2 - p(s_{t,j}|s_{t-1},V))$$

for some constants $k_1$ and $k_2$. In many embodiments, equation 4 can be simplified as $$p(s_{t,j}|s_{t-1}) = \eta(p(s_{t,j}|s_{t-1},V) + k) \quad (5)$$

where $\eta$ can be a normalization constant, k can act as a smoothing factor, and $$\eta = p(V) - p(\neg V)k_1$$

$$k = p(\neg V)k_1 k_2/\eta.$$

Figure 6:
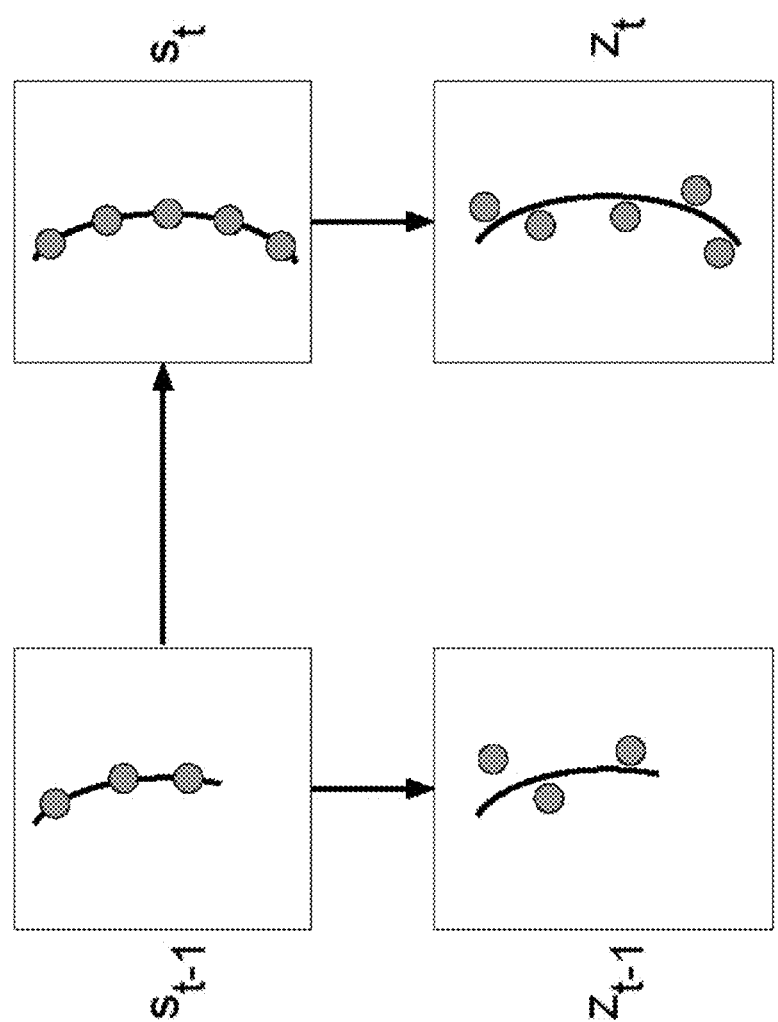
FIG. 6 is a diagram illustrating sampling of surface points and measurement points in accordance with an embodiment of the invention.

The sampling process is illustrated in FIG. 6 which shows an illustration of the sampling of surface points $s_t$ and measurement points $z_t$. Sensor noise can cause the measurements $z_t$ to not lie exactly on the object surface. Additionally, occlusions, changes in viewpoint, deformations, and random sampling can cause the visible surface points to change from $s_{t-1}$ to $s_t$.

Tracking

The Dynamic Bayesian Network described above can be used to track moving objects and estimate their velocity. $p(x_t|z_1 \ldots z_t)$, the probability of the state $x_t$ given the past observations, can be rewritten using Bayes' rule as $$p(x_t|z_1 \ldots z_t) = \eta p(z_t|x_t, z_1 \ldots z_{t-1}) p(x_t|z_1 \ldots z_{t-1}) \quad (6)$$

where $\eta$ can be a normalization constant. The first term can be a measurement model. In a standard Bayes filter algorithm, conditional independence assumptions can be used to simplify this as $$p(z_t|x_t, z_1 \ldots z_{t-1}) = p(z_t|x_t).$$

However, in many embodiments, this simplification can be prevented by the latent variables $s_1, \ldots, s_t$. Because all observations come from the same object surface, they cannot be considered independent of each other. Therefore, in various embodiments, a slightly different approximation can be made:

$$p(z_t|x_t, z_1 \ldots z_{t-1}) \approx p(z_t|x_t, z_{t-1}) \quad (7)$$

Intuitively, the current observation can be most strongly affected by the previous observation, rather than the entire past history of observations. Although tracking could be improved by using the entire past history of observations, this would add a computational cost that can be avoided. The second term on the right-hand side of equation 6 can be obtained from the motion model, which will be described in detail below.

Measure Model Derivation

Measurement models that can be utilized in a variety of embodiments of the invention are described below that can be derived using a Dynamic Bayesian Network similar to the Dynamic Bayesian Network discussed above with reference to FIG. 5. Equation 7 can be written using the joint distribution as $$p(z_t | x_t, z_{t-1}) = \int p(z_t, s_t | x_t, z_{t-1}) ds_t \quad (8)$$

$$= \int p(z_t | s_t, x_t) p(s_t | x_t, z_{t-1}) ds_t$$

where the chain rule of probability and the conditional independence assumptions can be used from the Dynamic Bayesian Network. The second term inside the integral can be further expanded as $$p(s_t | x_t, z_{t-1}) = \int p(s_t, s_{t-1} | x_t, z_{t-1}) ds_{t-1} \quad (9)$$

In various embodiments, independence assumptions from the Dynamic Bayesian Network as well as the independence assumption from equation 3 can be used to further expand the term inside this integral as $$p(s_t, s_{t-1} | x_t, z_{t-1}) = p(s_t | s_{t-1}) p(s_{t-1} | x_t, z_{t-1}) \quad (10)$$

$$= \eta p(s_t | s_{t-1}) p(z_{t-1} | x_t, s_{t-1}) p(s_{t-1})$$

$$= \eta p(s_t | s_{t-1}) p(z_{t-1} | s_{t-1}) p(s_{t-1})$$

where $\eta$ can be a normalization constant. $p(s_{t-1})$ can be a constant and therefore can be absorbed by the normalization constant r). The next two terms can be given by equations 2 and 5.

$$p(z_{t-1} | s_{t-1}) = \mathcal{N}(z_{t-1}; s_{t-1}, \Sigma_e)$$

$$p(s_t | s_{t-1}) = \eta(\mathcal{N}(s_t; s_{t-1}, \Sigma_r) + k)$$

where $\eta$ can be a normalization constant and k can be a smoothing term. In several embodiments, the integral in equation 9 can be evaluated as $$p(s_t | x_t, z_{t-1}) = \eta(\mathcal{N}(s_t; z_{t-1}, \Sigma_r + \Sigma_e) + k)$$

using the fact that the convolution of two Gaussians is another Gaussian. Additionally, equation 1 provides that $$p(z_t | s_t, x_t) = \mathcal{N}(z_t; s_t + x_{t,p}, \Sigma_e)$$

In some embodiments, the integral of equation 8 can be evaluated once again using the fact that convolution of two Gaussians is another Gaussian to generate $$p(z_t | x_t, z_{t-1}) = \eta(\mathcal{N}(z_t; z_{t-1} + x_{t,p}, \Sigma_r + 2\Sigma_e) + k).$$

In numerous embodiments, the measurement model can be calculated by letting $\bar{z}_{t-1} = z_{t-1} + x_{t,p}$; in other words, letting $\bar{z}_{t-1}$ be the points $z_{t-1}$ shifted by the position variable in the state $x_t$. Then, for each point $z_j \in z_t$, $\bar{z}_i$ can be the closest corresponding point in $\bar{z}_{t-1}$. The measurement model probability can then be calculated as $$p(z_t | x_t, z_{t-1}) = \eta \left( \prod_{z_j \in z_t} \exp\left(-\frac{1}{2}(z_j - \bar{z}_i)^T \Sigma^{-1}(z_j - \bar{z}_i)\right) + k \right) \quad (11)$$

where $\eta$ can be a normalization constant and k can be a smoothing factor. The covariance matrix $\Sigma$ can be given by $\Sigma = 2\Sigma_e + \Sigma_r$, with covariance terms for $\Sigma_e$ due to sensor noise and $\Sigma_r$ due to the sensor resolution. To perform this calculation, the previous points $z_{t-1}$ can be shifted by the proposed velocity $x_t$ to obtain the shifted points $\bar{z}_{t-1}$. Then, for each point $z_j$ in the current frame, the corresponding nearest shifted point $\bar{z}_i \in \bar{z}_{t-1}$ can be found. Given these correspondences, the measurement model can then be calculated using equation 11.

Tracking with Color

In many embodiments, a 3D-based model can be used when no color information is available. However, if color is available (such as from a video camera), color matches can be incorporated into the probabilistic model. To leverage color, the probability distribution over color for correctly aligned points can be learned. To do so, a large dataset can be built of correspondences (with in some embodiments, a 5 cm maximum distance) between colored laser returns from one laser spin and each of their spatially nearest points from the subsequent spin, aligned using recorded ego motion. By observing how the color of this point changes as it is moved past, the probability distribution for color changes over a single frame can be learned A normalized histogram can be built of the differences in color values between each point and its closest neighbor from the next spin. In some embodiments, the distribution closely follows a Laplacian distribution.

In various embodiments, multiple color channels can be incorporated into the model. However, such a model would require learning the covariances between different color channels. In many embodiments, the model can be simplified by incorporating just a single color channel (for example, blue), chosen using a hold-out validation set. Although adding other color channels can provide additional benefit, improved tracking performance can be shown with just one color channel.

The learned color distribution can be incorporated into the measurement model described above. The term $p(s_{t,j} | s_{t-1}, V)$ from equation 4 can represent the probability of sampling point $s_{t,j}$ given that the surface from which it is sampled was previously visible at time t−1. This term can be expanded as a product of spatial and color probabilities:

$$p(s_{t,j} | s_{t-1}, V) = p_s(s_{t,j} | s_{t-1}, V) p_c(s_{t,j} | s_{t-1}, V) \quad (12)$$

where $p_s(s_{t,j} | s_{t-1}, V)$ can be the probability based on the spatial match with the points in $s_{t-1}$, and $p_c(s_{t,j} | s_{t-1}, V)$ can be the probability based on the color match with the points in $s_{t-1}$. As described above, the spatial match probability can be modeled as $p_s(s_{t,j} | s_{t-1}, V) = \mathcal{N}(s_{t,j}; s_{t-1,i}, \Sigma_r)$, where $\Sigma_r$ models the variance resulting from the sensor resolution as well as from object deformations and $s_{t-1,i}$ is the nearest corresponding (latent) surface point from the previous frame.

In several embodiments, for the color match probability, due to changes in lighting, lens flare, or other unmodeled causes, the observed colors of an entire image can change drastically between two frames. Therefore, there can be some probability $p(\neg C)$ that all of the observed colors in an image will change in a way that is not modeled by the learned color distribution. The color match probability from equation 12 can be written as $$p_c(s_{t,j} | s_{t-1}, V) = p(C) p_c(s_{t,j} | s_{t-1}, V, C) + p(\neg C) p_c(s_{t,j} | s_{t-1}, V, \neg C) \quad (13)$$

where $p_c(s_{t,j} | s_{t-1}, V, C)$ can be the learned color model distribution (parameterized as a Laplacian) and $p_c(s_{t,j} | s_{t-1}, V, \neg C) = 1/255$ can be the probability of a point having any color, given that the color does not need to match to that of a nearby point from the previous frame.

The probability that the color should match between two aligned points, p(C), must be chosen with care. In many embodiments, when coarsely sampling the state space as described in detail below, colors are not expected to match very well. Therefore, p(C) can be set to be a function of the sampling resolution as $$p(C) = p_c \exp\left(\frac{-r^2}{2\sigma_c^2}\right) \quad (14)$$

where r can be the sampling resolution and $\sigma_c$ can be a parameter that controls the rate at which p(C) decreases with increasing resolution. Therefore, when sampling is coarse, p(C) can have a smaller value and colors are not expected to match at a coarse resolution. As sampling becomes more fine, p(C) can increase until $p(C)=p_c$ when $r=0$, so colors can match more precisely at a finer sampling resolution.

In various embodiments, the measurement model can be computed incorporating color as follows: As described before, let $\bar{z}_{t-1} = z_{t-1} + x_{t,p}$; in other words, $\bar{z}_{t-1}$ can be the points $z_{t-1}$ shifted by the position variable in the state $x_t$. Then, for each point $z_j \in z_t$, $\bar{z}_i$ can be the closest corresponding point in $\bar{z}_{t-1}$. For each point, the spatial probability can be calculated as $$p_s(z_j|x_t, z_{t-1}) = \exp(-\tfrac{1}{2}(z_j - \bar{z}_i)^T \Sigma^{-1}(z_j - \bar{z}_i))$$

The color probability can be calculated as $$p_c(z_j|x_t, z_{t-1}, V) = p(C) p_c(z_j|\bar{z}_i, V, C) + p(\neg C) p_c(z_j|\bar{z}_i, V, \neg C)$$

where p(C) can be given by equation 14, $p_c(z_j|\bar{z}_i, V, C)$ can be given by the learned color model distribution (parameterized as a Laplacian), $p(\neg C) = 1 - p(C)$, and $p_c(z_j|\bar{z}_i, V, \neg C) = 1/255$. Finally, the total measurement probability is calculated as $$p(z_t | x_t, z_{t-1}) = \\ \eta\left(\prod_{z_j \in z_t} p_s(z_j | x_t, z_{t-1}) p_c(z_j | x_t, z_{t-1}, V) + k_3(k_4 - p_s(z_j | x_t, z_{t-1}))\right)$$

where $k_3$ can be calculated from k in equation 11 as $k_3 = k/(k+1)$. The parameter $k_4$ can be a smoothing parameter that can be chosen via cross-validation. In various embodiments, $k_4$ can be set to 1.

Motion Model

A motion model can be incorporated into the tracker. In several embodiments, adding a motion model significantly improves tracking performance. To build the motion model, the values for $p(x_t|z_1 \ldots z_t)$ from the previous frame can be fit to a multi-variate Gaussian to the set of probabilities. The mean $\mu_t$ and covariance $\Sigma_t$ can be calculated by weighting each state by its probability as $$\mu_t = \sum_i p(x_{t,i} | z_1 \ldots z_t) x_{t,i}$$

$$\Sigma_t = \sum_i p(x_{t,i} | z_1 \ldots z_t)(x_{t,i} - \mu_t)(x_{t,i} - \mu_t)^T$$

where $x_{t,i}$ can be the state vector of sample i. Once a Gaussian over the posterior is obtained, the result can be used in the standard constant velocity model of a Kalman filter.

Implementation of Tracking

In some embodiments, the measurement model can be calculated by using a kd-tree to search for the nearest-neighbor for each point. The space can be divided into a grid and the log probability for each grid cell after each search can be cached. Thus, for each grid-cell, only a single search is performed in the kd-tree. A quick table lookup of the cached result can be performed. The discretization of the measurement grid can be set equal to the state-space sampling resolution as described in detail below.

Various other embodiments can use a pre-caching technique. The space is divided into a grid as above, and for each point $z_i \in z_{t-1}$, the probability of a point from $z_t$ falling into such a grid cell can be pre-cached using the measurement model of equation 11. Because all points for a given object have the same covariance $\Sigma$, much of the work for this computation can be done once and then reused for all points. Using pre-caching can avoid having to perform relatively costly kd-tree searches.

Additionally, it is noted that equation 11 is not symmetric with respect to $z_t$ and $z_{t-1}$, especially if the two point clouds are different sizes. Specifically, suppose that $z_t$ is much larger than $z_{t-1}$ due to points becoming unoccluded (or remaining occluded but less of the object remaining occluded). In such a case, a large penalty can be incurred for each point in $z_t$ that does not have a nearby match in $z_{t-1}$. The tracker can focus on aligning the densest part of $z_t$ in order to minimize the number of unmatched points. This can lead to an incorrect alignment estimate. In many embodiments, the tracker can rectify this problem by choosing the larger of $z_t$ and $z_{t-1}$ (in terms of the number of points) to play the "role" of $z_{t-1}$ and the smaller point cloud will play the "role" of $z_t$ in equation 11. Thus, as described above, the space can be divided into a grid, the larger of $z_t$ and $z_{t-1}$ can be pre-cached in this grid. Each point can be iterated over from the smaller of $z_t$ and $z_{t-1}$ and probabilities can be looked up in the grid to calculate the measurement model of equation 11. By performing the computation in this manner, performance improvements may be obtained. It is important to remember, when implementing these embodiments, that the resulting alignment will give the opposite of the actual velocity if $z_{t-1}$ and $z_t$ were switched to perform this computation. In various embodiments, a hybrid approach can be achieved by combining aligning the roles of smaller and larger point clouds with using a kd-tree to search for the nearest-neighbor for each point.

Annealed Dynamic Histograms

In several embodiments, using the techniques described above, the measurement model and motion model probabilities can be very quick to compute for any particular candidate alignment between frames. However, these probabilities are calculated separately for every state $x_t$ considered. If the state space is densely sampled, then there will be a large number of computations to perform, potentially rendering this method too slow for real-time use on certain computing platforms. In order to enable the method to globally explore the state space in real-time, a technique called annealed dynamic histograms can be utilized. Processes which can utilize annealed dynamic histograms are discussed further below.

Derivation of Annealed Dynamic Histograms

Figure 7:
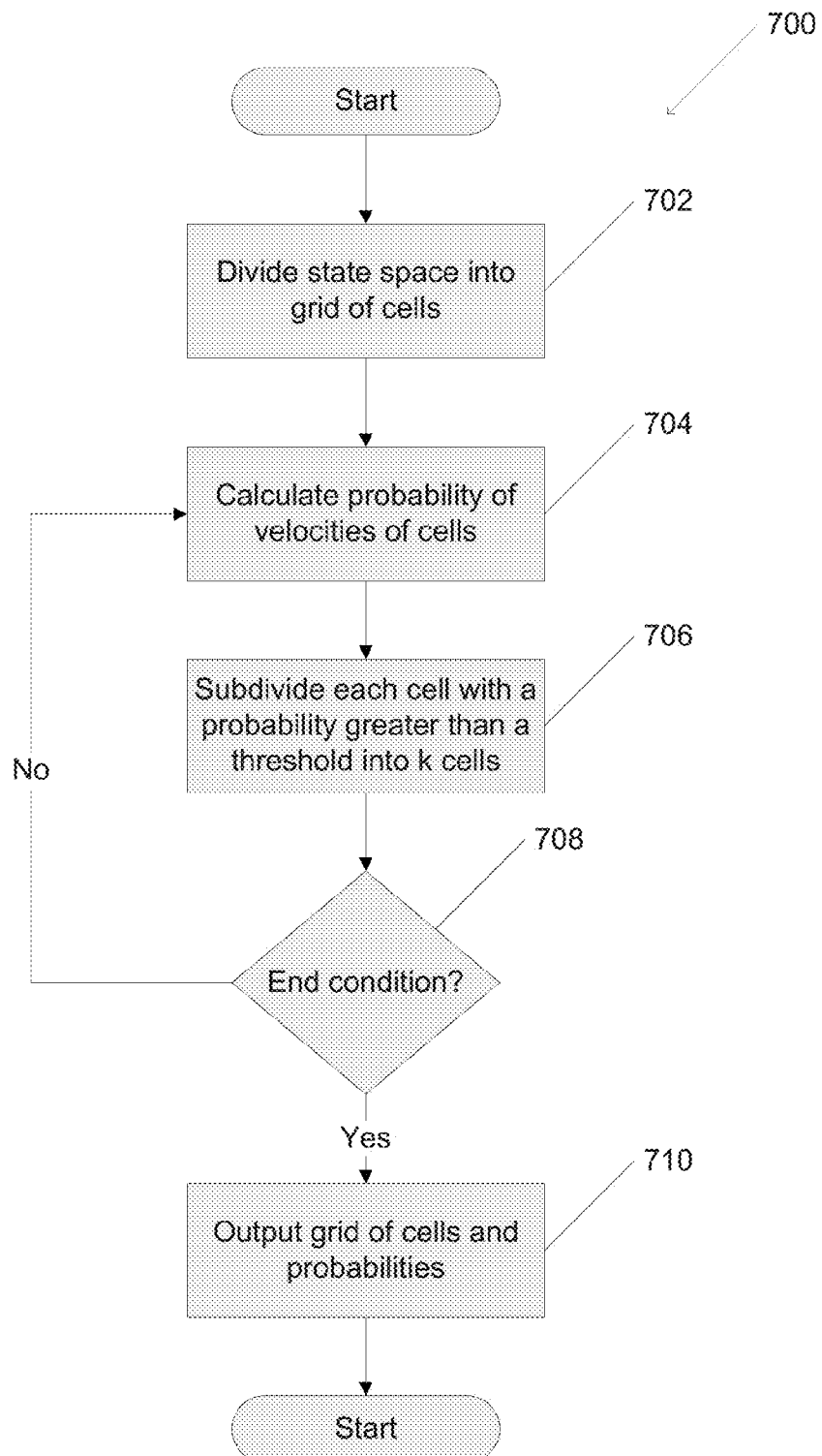
FIG. 7 is a flow chart illustrating a process for utilizing annealed dynamic histograms in accordance with an embodiment of the invention.

A process that utilizes annealed dynamic histograms to perform motion tracking in accordance with an embodiment of the invention is illustrated in FIG. 7. The process 700 includes dividing 702 a state space similar to the Dynamic Bayesian Network described above with reference to FIG. 5 into a grid of cells. In some cases this initial grid can have a coarse resolution, but may begin with any resolution. The probability of velocities of those cells can be calculated 704. Each cell with a probability greater than a threshold can be subdivided 706 into k cells (or sub-cells). A process for deciding a number k will be discussed below. Dividing cells into more cells will increase the resolution in those areas of the state space. If an end condition 708 has been reached, the grid of cells and probabilities are output 710 by the process. In various embodiments, the end condition can be a desired runtime and/or a desired resolution of the state space. If an end condition 708 has not been met, the probability of velocities are once again calculated 704, but for the subdivided cells. Those cells can then be subdivided 706 into k cells (or sub-cells) where the probability is greater than the threshold, and the cycle repeats until an end condition is met. Although a number of different processes utilizing annealed dynamic histograms are described above with respect to FIG. 7, any of a variety of processes can be utilized to globally explore the probability of velocities of tracked objects in a state space as appropriate to the requirements of specific applications in accordance with various embodiments of the invention.

Figure 8A:
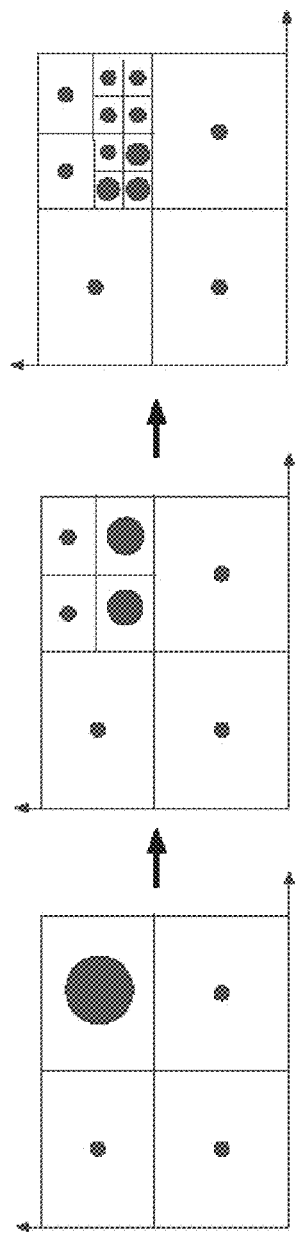
FIG. 8A is a diagram illustrating dynamic decomposition of a state space using annealed dynamic histograms in accordance with an embodiment of the invention.

An overall approach to dynamic histograms can be visualized in FIG. 8A which illustrates a dynamic decomposition of a state space using annealed dynamic histograms. Coarse sampling is shown on the left and the distribution is refined over time moving to the right. The size of the circle is proportional to the sample's alignment probability. In many embodiments, the state space can be coarsely divided into grid cells and the probability $p(x_t|z_1 \ldots z_t)$ for each cell is calculated. Some of the cells are then recursively expanded, subdividing each cell into k sub-cells. A method for deciding which cells to divide and for computing the probability of each of the new sub-cells follows.

As described above, the state space is divided into a coarse grid. Some cells can then be subdivided into k sub-cells, based on a criteria to be established below. R can be the (possibly non-contiguous) set of all cells chosen to subdivide into sub-cells $c_i$. The discrete probability of the sub-cell $c_i \in R$ can be calculated as follows:

$$p(c_i) = p(c_i \cap R)$$
$$= p(c_i | R)p(R)$$
$$= \frac{p(x_i | z_1 \ldots z_t)|c_i|}{\sum_{j \in R} p(x_j | z_1 \ldots z_t)|c_j|} p(R)$$
$$= \eta p(x_i | z_1 \ldots z_t)p(R)$$

where $|c_i|$ can be the volume of sub-cell $c_i$. Therefore, it can be shown that $\sum_{i \in R} p(c_i) = p(R)$. The key here is that the normalization constant $\eta$ depends only on other sub-cells in region R. Thus, the probability values of all cells outside of region R are unaffected by this computation.

In many embodiments, the criteria for choosing which cells to divide can now be derived, based on minimizing the KL-divergence between the current histogram and the true posterior. Suppose distribution B can be the current estimated distribution before a given grid cell can be divided, and distribution A can be the new estimated distribution after the grid cell can be divided into k sub-cells. In distribution A, the k new sub-cells can each take on separate probabilities, allowing more accurate approximations of the true posterior. The KL-divergence between distributions A and B can measure the difference between the old, coarser approximation to the posterior and the new, improved approximation to the posterior. The size of the KL-divergence indicates how much the approximation can improve to the posterior by dividing a given grid cell.

Figure 8B:
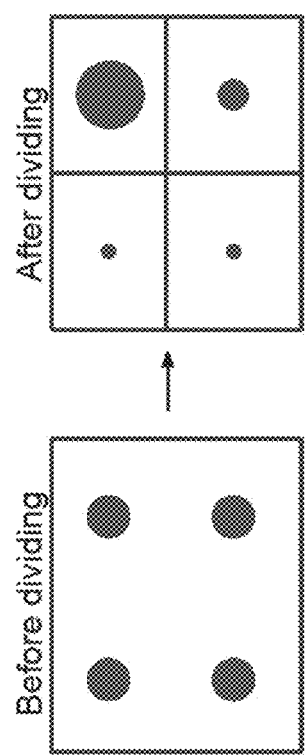
FIG. 8B is a diagram illustrating a cell before and after dividing in process that utilized annealed dynamic histograms in accordance with an embodiment of the invention.

In numerous embodiments, a cell can have a discrete probability $P_i$, and suppose a decision is being made whether to divide this cell. Before dividing, the cell can be viewed as having k sub-cells, each of whose probability is constrained to be $P_i/k$. After dividing, each of the sub-cells can take on a new probability $p_j$, with the constraint that $\sum_{j=1}^{k} p_j = P_i$. This situation is shown in FIG. 8B which illustrates a cell before and after dividing. Before dividing, the cell can be viewed as having sub-cells whose probabilities are all constrained to be equal. After dividing, each of the sub-cells can take on its own probability.

The KL-divergence between these two distributions can be computed as $$D_{KL}(A \| B) = \sum_{j=1}^{k} p_j \ln\left(\frac{p_j}{P_i/k}\right)$$

where B is the distribution before dividing and A is the distribution after dividing. The KL-divergence will obtain its maximum value if $p_{j'} = P_i$ for some j' and $p_j = 0$ for all $j \neq j'$. In this case, it can be shown that $$D_{KL}(A\|B) = P_i \ln k \quad (15)$$

If the computation for each of the k sub-cells takes t seconds, then the maximum KL-divergence per second is then equal to $P_i \ln k/(kt)$. If the goal is to find the histogram that matches as closely as possible to the true posterior, then all cells whose probability $P_i$ exceeds some threshold $p_{min}$ can simply be divided. Similarly, to achieve the maximum benefit per unit time, k can be chosen to be as small as possible. In many embodiments, for a histogram in d dimensions, $k=3^d$ can be used, splitting cells into thirds along each dimension.

Annealing

In several embodiments, when the state space is sampled at a very coarse resolution, it is not expected to find a good alignment between the previous frame and the current frame for the tracked object. In fact, the sampling resolution (shown in FIG. 8A) introduces another source of error into the model. Therefore, many embodiments can increase the variance of the measurement model Gaussian by some amount $\Sigma_g$, proportional to the resolution of the state-space sampling. The measurement model variance can now become $\Sigma = 2\Sigma_e + \Sigma_r + \Sigma_g$. As regions of the state space can be sampled at a higher resolution, as shown in FIG. 8A $\Sigma_g$ decreases towards 0. The measurement model is thus accordingly annealed as the sampling of the state space can be refiled, motivating the name for the method of "annealed dynamic histograms." The complete method can then be implemented as shown in pseudocode in FIG. 9.

Using the Tracked Velocity Estimates

In several embodiments, the tracker can return information about the tracked object's velocity in any format, as requested by the planner or some other component of the system. For example, to minimize the RMS error, the mean of the posterior can be returned. On the other hand, to build accurate object models, the tracker can return the mode of the distribution. A simple planner might request either the mean or the mode of the posterior distribution, as well as the variance. A more sophisticated planner could make use of the entire tracked probability histogram, in the form of a density tree.

The mean of the distribution can minimize the RMS error. In various embodiments, the true distribution over velocities can be p(v), where the distribution is based on the probabilistic noise in the measurement (from the sensor noise and the sensor resolution). To minimize the RMS error, a velocity $\hat{v}$ can be found that minimizes $$\min_{\hat{v}} E(\hat{v} - v)^2$$

where the expectation can be taken with respect to p(v). To minimize this, the expectation can be rewritten as a sum:

$$\min_{\hat{v}} \sum_v p(v)(\hat{v} - v)^2$$

The derivative can then be taken with respect to $\hat{v}$ and set to 0 to get $$2\sum_v p(V)(\hat{v} - v) = 0$$
$$\sum_v p(v)\hat{v} = \sum_v p(v)v$$
$$\hat{v}\sum_v p(v) = \sum_v p(v)v$$
$$\hat{v} = \mu_v$$

where p(v) can be a probability distribution, so $\Sigma_v p(v)=1$. The expression $\Sigma_v p(v)v$ is simply the mean of v, $\mu_v$, thus demonstrating that the mean of the distribution, rather than the mode, can minimize the RMS error. In various embodiments, depending on which objective is important for a particular application, the tracker can return the mean, the mode, and/or the entire distribution, as described above.

Estimating Rotation

In numerous embodiments, the rotation of the tracked object can be estimated in addition to the translation. To estimate the rotation, the mode of the posterior distribution over the translation is found. A coordinate descent can be performed in each rotational axis, holding translation fixed. Based on the application, yaw, roll, and pitch can be searched over individually. Because each axis of rotation can be separately searched, this optimization can be relatively quick to perform.

In various embodiments, rotation can be estimated by the tracker in a variety of ways depending on the application. The tracker can first estimate the translation and then estimate the rotation. Additionally, the tracker can alternate between estimating the translation and estimation the rotation. When estimating the rotation, the tracker can perform coordinate descent, estimating the rotation one dimension at a time. Alternatively, the tracker can jointly estimate the rotation simultaneously over all rotational directions. In addition, the tracker can separately estimate the translation for a number of different possible rotations. Furthermore, the tracker can jointly estimate the translation and rotation together in a joint 6-dimensional state space.

System Simulation

A 3D point cloud for object tracking simulations is obtained with a Velodyne HDL-64E S2 LIDAR mounted on a vehicle. The Velodyne has 64 beams that rotate at 10 Hz, returning 130,000 points per 360 degree rotation over a vertical range of 26.8 degrees. These points are colored with high-resolution camera images obtained from 5 Point Grey Ladybug-3 RGB cameras, which use fish-eye lenses to capture 1600×1200 images at 10 Hz. The laser is calibrated using standard techniques. The vehicle pose is obtained using the Applanix POS-LV 420 inertial GPS navigation system. Simulations were performed single-threaded on a 2.8 GHz Intel Core i7 processor.

Results of Simulations

The simulated tracker is evaluated on a large number of tracked objects. Parked cars with a local reference frame in which they appear to be moving are tracked which allows the accuracy of the velocity measurements to be directly measured.

Choosing Parameters for Simulations

Parameters for the simulated model, as well as parameters for the baseline methods for comparison, were chosen by performing a grid search using a simulated training set that is completely separate from the simulated test set. The simulated training set consists of 13.6 minutes of logged data, during which time a total of 662 parked cars were driven past. Using this simulated training set, the final parameters chosen for the system are as follows, for an object with a horizontal sensor resolution of r meters and a state-space sampling resolution of g: k=0.8, $\Sigma_e^1 = 2\Sigma_e = (0.03 \text{ m})^2 I$, $\Sigma_r = (r/2)I$, and $\Sigma_g = gI$, where I is the 3×3 identity matrix. For the dynamic histogram, a coarse resolution of 1 m is initialized, and the simulated tracker continued until the resolution of the resulting histogram is less than max(r, 0.05 m), with $p_{min} = 10^{-4}$. For the color model, $p_c = 0.05$ and $\sigma_c = 1$ m were chosen. Because the data contains many frames with lens flare as well as underexposed frames, the simulated system learns to assign a low priority to color matches. The learned color distribution for aligned points is given by a Laplacian with parameter b=13.9. For all methods tested, the current frame's point cloud is downsampled to no more than 150 points and the previous frame to no more than 2000 points, where the current frame $z_t$ and previous frame $z_{t-1}$ are chosen as described above.

Evaluation of the Dataset of the Relative Reference Frame

In many embodiments, an approach to quantitatively evaluate the results of the simulated tracker is to track parked cars in a local reference frame in which they appear to be moving. In a 6.6 minute test dataset, 557 parked cars were driven past. However, in a local reference frame, each of these parked cars appears to be moving in the reverse direction of the simulated tracker's motion. Because the simulated tracker logs velocity, the ground-truth relative velocity of a parked vehicle in this local reference frame can be computed to the precision of simulated tracking velocity estimates. Furthermore, each car is driven past, the viewpoint and occlusions can change over time, which enables evaluation of the simulators response to many real-world challenges associated with tracking. Further simulated quantitative results when tracking moving objects of different classes (cars, bikes, and pedestrians) will be shown below, to demonstrate that the method works on moving objects and generalizes across object types.

Figure 10A:
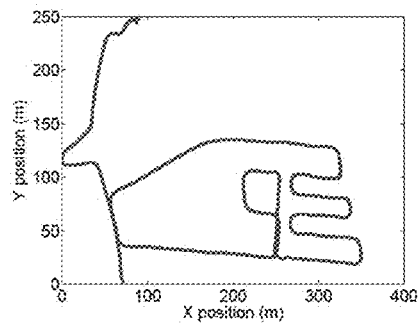
FIG. 10A is a diagram illustrating a path taken by a vehicle to gather data for simulations.
Figure 10B:
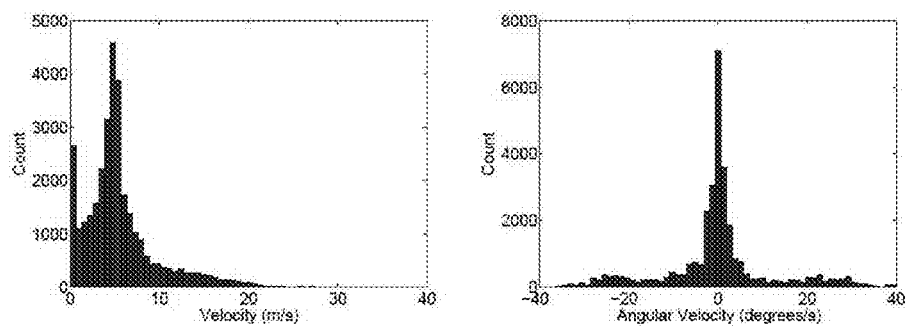
FIG. 10B is a diagram illustrating the distribution of relative velocities of vehicles in a simulated test set.

During the 6.6 minutes of the simulated test set, the trajectory follows the path shown in FIG. 10A, which illustrates the path taken by the vehicle while recording the data use for the simulated test set. During this simulated test set, the relative motion of vehicles being tracked can take a range of linear and angular velocities, as shown in FIG. 10B, which illustrates a distribution of relative velocities of vehicles in a simulated test set with linear velocities on the left and angular velocities on the right. The mean linear velocity is 5.6 m/s, with a standard deviation of 4.2 m/s. In various embodiments, this range of linear velocities can be the result of two effects. First, the ego vehicle changes its own velocity throughout the dataset, causing the relative velocity of nearby vehicles to change accordingly. Second, the ego vehicle makes a number of rotations throughout the dataset, as can be seen in FIG. 10A. When the ego vehicle rotates, the relative motion of nearby objects will vary based on their distance to the ego vehicle. These two effects can combine to produce a range of relative velocities for the different vehicles in the simulated test set, as shown in FIG. 10B.

Tracks that contain major undersegmentation issues can be ignored, in which the tracked object is segmented together with another object as this can lead to an ambiguity about the correct ground-truth alignment. Therefore, 7% of the simulated initial tracks are filtered out based on segmentation issues, leaving 515 properly segmented cars to track. In some embodiments, tracks in which the tracked object has been oversegmented into multiple pieces are not filtered out.

Baseline Comparison for Simulations

Figure 11:
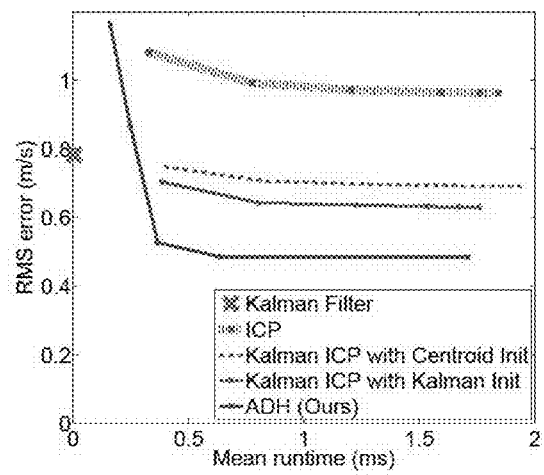
FIG. 11 is a diagram illustrating RMS error vs runtime error of the simulated method compared to several baseline methods.

To compare the robustness of different tracking methods, the RMS tracking error is calculated for each method. The results are shown in FIG. 11, which illustrates RMS error vs runtime error of the simulated method compared to several baseline methods. (The centroid-based Kalman filter runs in 0.004 ms, which is difficult to visualize on the scale shown in FIG. 11.)

A Kalman filter can be evaluated with a measurement model given by the centroid of the tracked points. Because of its speed and ease of implementation, this is a popular method. As can be seen in FIG. 11, this method is extremely fast, completing in less than 0.1 milliseconds. However, the method is not very accurate, producing an RMS error of 0.78 m/s across the 515 cars in the simulated test set.

A number of variants of the iterative closest point method (ICP) can be evaluated. The basic point-to-point ICP algorithm can be evaluated. As is standard, ICP can be initialized by aligning the centroids of the tracked object. ICP is simulated to run for 1, 5, 10, 20, 50, and 100 iterations, and the results are shown in FIG. 11. It is clear from FIG. 11 that the basic ICP algorithm does not perform well for tracking, with an RMS error 23% worse than that of a simple Kalman filter. It can be shown that this decrease in accuracy is because the standard ICP algorithm does not make use of a motion model, which is crucial for robust tracking.

A Kalman filter with ICP used as the measurement model can also be compared. Combining ICP with the motion model in a Kalman filter makes the method much more robust to failures of ICP. Because ICP is dependent on its initialization, three different strategies to initialize this method are simulated. ICP can be initialized by aligning the centroids of the tracked object, by using the mean prediction from the motion model, and by first running the centroid through a Kalman filter and using the output as the initialization for ICP.

FIG. 11 compares these three methods. Initializing using the mean prediction from the motion model is not shown on this plot because the performance is significantly worse than the other methods tested, giving an RMS error of 2.6 m/s. An analysis of why this occurs reveals that this method performs well when the tracked object is moving at a relatively constant velocity, but it performs poorly when the object is quickly accelerating or decelerating. Thus, initializing ICP with the mean prediction of the motion model can be a poor choice for tracking objects that can quickly change velocity.

Using a Kalman filter with ICP initialized by aligning the centroids, performs reasonably, with an improvement of 11.7% over a simple Kalman filter. Finally, running the centroid through a Kalman filter and using the output as the initialization for ICP (and using the ICP result as the measurement model for another Kalman filter) generates the best performance of the ICP baseline methods that were simulated, with an RMS error of 0.63 m/s. However, simulated versions of ICP suffer from the problem of choosing a good initialization. The simulated tracker, in contrast to all of the ICP methods, is more robust in that it does not depend on the initialization.

The simulated tracker achieves an accuracy of 0.53 m/s after running for just 0.37 milliseconds. Even at this minimum runtime, this performs 32.7% better than a simple Kalman filter and 25% better than all of the baseline methods of similar speed, as shown in FIG. 11. If the simulated tracker is allowed to run for 0.64 milliseconds, it can achieve an accuracy of 0.49 m/s, which is 23% better than all baseline methods that were tested. Note also that this is an average over 515 tracked vehicles, and that the tracking accuracy varies as a function of distance. For example, for objects within 5 m, the method achieves an RMS error of 0.15 m/s, whereas for objects 65 m away, the method achieves an RMS error of 1.4 m/s.

In various embodiments, if color images are available, then the measurement model can easily be extended to incorporate color as described above. With the addition of color, the simulated RMS error decreases by an additional 10.4%, achieving an RMS error of 0.43 m/s. Note that many frames in the simulated test set contain heavy shadows or lens flare. Therefore, color can be expected to make an even bigger difference when lens flare and similar exposure problems can be avoided.

It is interesting to compare the performance of the simulated tracker to that of a radar, which can also be used to measure the velocity of moving objects. The Bosch LLR3 Radar can estimate velocities to within 0.12 m/s. However, a radar only estimates velocity in a single dimension: in the direction from the radar to the tracked object. This one-dimensional estimate is of limited use for robotics or autonomous driving, in which a 2D estimate of the velocity of each object is preferred in order to estimate where each object is moving. The simulated tracker returns a 2D velocity estimate, and by searching over vertical motion and over rotations the simulation can be made to return a 6D velocity estimate.

In some embodiments, the simulation can be modified to align the smaller set of points to the larger set of points, as explained above, instead of always aligning the more recent points $z_t$ to the points from the previous frame $z_{t-1}$. By aligning the smaller set of points to the larger set, a 10% improvement in RMS error can be achieved, from 0.54 m/s to 0.49 m/s. In other embodiments, combining this with a simulated tracker that incorporates color can generate an even bigger improvement at 12.6%, from 0.50 m/s RMS error to 0.43 m/s.

In various embodiments, a fast pre-caching scheme to compute the measurement model as opposed to kd-tree searches. The resulting simulated tracker is almost 3 times faster at the same level of resolution, reducing the speed from 1.8 milliseconds per frame to 0.64 milliseconds per frame at a sampling resolution of 3.7 cm. By avoiding kd-tree searches and re-using the covariance computations for each point, a significant speedup can be obtained.

Sample Analysis

Figure 12:
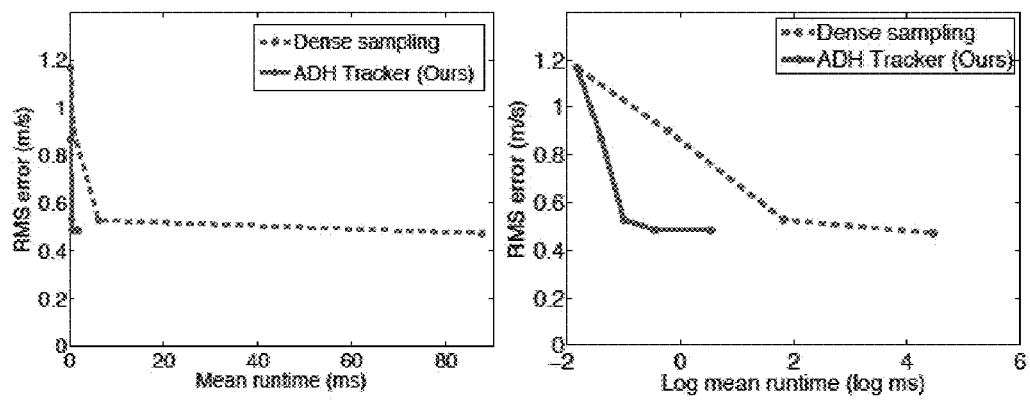
FIG. 12 is a diagram illustrating accuracy vs mean runtime using annealed dynamic histograms compared to densely sampling the state space.

One of the novel additions of the simulated tracker method is the use of annealed dynamic histograms, as described in above, to speed up the tracker. FIG. 12 illustrates accuracy vs mean runtime using annealed dynamic histograms compared to densely sampling the state space in mean runtime (right) and on a log time scale (left). In FIG. 12, the decrease in speed is shown if the search space is densely sampled. Densely sampling is about 138 times slower for approximately the same level of accuracy. When searching over alignments, all cells whose probability exceeds a minimum threshold $P_{min}$ can be expanded. If instead only the single highest probability cell on each step were expanded, the simulated RMS error would increase by 46.3%.

A multi-resolution model can also be compared. A multi-resolution model that computes a low-resolution model (0.3 m) and a high-resolution model (0.03 m) is simulated. The low-resolution model is computed by taking a maximum over the high-resolution regions. Sampling then alternates between the low and high resolution models until the method has found the maximum of the high resolution model. Due to the way in which the low resolution model is constructed, this model is guaranteed to find the global maximum of the high resolution model. Indeed, the search space can be sampled in the multi-resolution method as describe above and the mean of the resulting distribution is taken and a resulting RMS accuracy of 0.49 m/s can be achieved, which is the same accuracy achieved by sampling with the simulated ADH tracker.

However, the multi-resolution sampling method can be much slower than the sampling method of the simulated ADH tracker. The simulated ADH tracker takes about 0.64 ms per object per frame, whereas the simulated multi-resolution tracker takes 14.5 ms per object per frame, or a 24 times reduction in speed. The main reason that the multi-resolution tracker is slower is that it requires more samples from the state space to find the mode, requiring an average of 3899 samples, whereas the simulated ADH tracker uses an average of only 172 samples. The simulated ADH tracker thus requires 23 times fewer samples, which almost completely accounts for the difference in runtime. Furthermore, if a hard limit is placed on the number of samples taken by the multi-resolution tracker, the error rate increases dramatically, indicating that early-stopping to decrease the runtime is not a viable option for the multi-resolution tracker.

There are multiple differences between the sampling methods of the simulated ADH tracker and that of the simulated multi-resolution tracker. One difference is that the ADH tracker can sample at many levels of resolution. In the simulated implementation, the ADH tracker begins with a coarse sampling of 1 m. The tracker then repeatedly reduces the sampling resolution by a factor 3, thus sampling at 0.33 m, then 0.11 m, and finally at 0.03 m. In contrast, the two level multi-resolution tracker samples at only 2 resolutions: first a coarse sampling at 0.3 m, followed by a fine sampling at 0.03 m.

To understand how important this difference was, the ADH tracker was modified so that it also samples only at 2 resolutions: a coarse sampling of 0.3 m followed by a fine sampling of 0.03 m, just like the simulated two level multi-resolution tracker. Despite this change, the ADH tracker is still more efficient, running in 2 ms, or a speedup of a factor of 7 over the two level multi-resolution tracker. This speedup factor of 7 must then be based on a fundamental difference in the sampling method between the two level multi-resolution tracker and ADH trackers. It can be concluded that the ADH tracker gains a 3.3 times speedup over the multi-resolution tracker by using a 4-level resolution model rather than a 2-level resolution model, and the ADH tracker gains an additional 7 times speedup based on the method of sampling alone.

The cause of the factor of 7 speedup over the multi-resolution tracker is based on the way in which samples are generated. To sample at a coarse resolution, the multi-resolution tracker takes a maximum over the corresponding high resolution regions. In contrast, the ADH tracker increases the noise of the measurement model by an amount proportional to the sampling resolution. Taking a maximum as in the multi-resolution tracker provides an extreme level of smoothing and thus too many samples at the coarse resolution appear to have a high probability. In contrast, increasing the measurement noise in the ADH tracker still leads to an informative distribution at the coarse resolution, in that low probability regions at a high resolution tend to correspond to low probability regions at the coarse resolution. Thus, in the ADH tracker, the coarse resolution is more informative about which regions are most likely to contain the mode of the high resolution distribution. As a result, the ADH tracker requires fewer samples to find the mode.

A further factor of 3.3 speedup is obtained using a 4-level sampling resolution model rather than just the 2-level sampling resolution model of the multi-resolution tracker, as explained above. Unfortunately, it is not possible to simply extend the multi-resolution tracker to more than 2 levels of resolution. The multi-resolution tracker uses the coarse resolution to find the mode of the higher resolution, and the method is considered to be converged once the mode of the higher resolution is discovered. In a 4-level sampling resolution model, the lowest resolution model would continue sampling until it has found the mode of the 2nd lowest resolution model. However, this mode does not necessarily correspond to the mode of the highest resolution model, so stopping at this point would not be helpful. Further, the method is already much slower than the ADH tracker, so continuing to sample would also not be practical. Thus, the multi-resolution tracker suffers by not being extensible to more than a 2-level sampling resolution model, whereas the ADH tracker naturally extends to many levels of sampling resolution.

Figure 13:
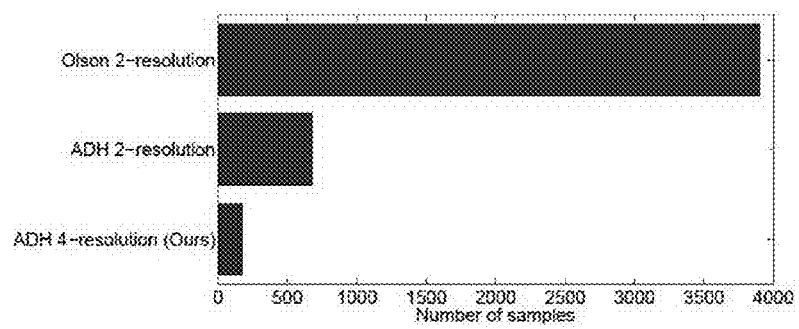
FIG. 13 is a diagram illustrating the number of samples required by different simulated methods to create the same tracking accuracy.
Figure 14:
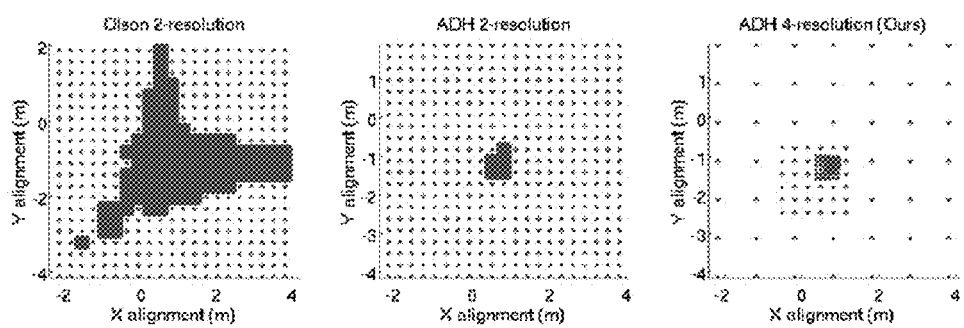
FIG. 14 is a diagram illustrating a visualization of the number of samples required by three different simulated sampling methods to achieve the same level of accuracy.

These results are summarized in FIG. 13 which illustrates the number of samples required by different methods to create the same tracking accuracy. Top: The simulated multi-resolution tracker. Middle: The simulated ADH tracker, modified to have only 2 levels of sampling resolution. Bottom: The simulated ADH tracker, using the full model with 4 levels of sampling resolution. The simulated multi-resolution tracker requires an average of 3899 samples to achieve an accuracy of 0.49 m/s. The simulated ADH tracker, modified to have only 2 levels of sampling resolution like the multi-resolution tracker, requires only 680 samples on average to achieve the same accuracy. Finally, the simulated full method, with 4 levels of sampling resolution, requires only 172 samples to achieve the same level of accuracy. As explained above, the runtime is proportional to the number of samples, so the greater number of samples required by leads to a significantly slower method, which can make the method not feasible for real-time tracking in autonomous driving applications. A visualization of the number of samples required by the three methods are shown for a specific example in FIG. 14 which illustrates a visualization of the number of samples required by three different sampling methods to achieve the same level of accuracy. Each point represents a single sample. Regions with a large number of closely-spaced samples appear as a solid color. Left: The simulated multi-resolution tracker. Middle: The simulated ADH tracker, modified to have only 2 levels of sampling resolution. Right: The simulated ADH tracker, using the full model with 4 levels of sampling resolution.

Simulated Error Analysis

Figures 15, 16:
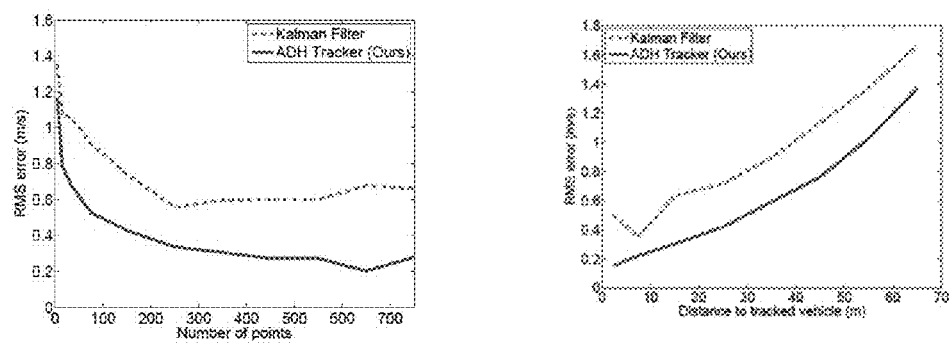
FIG. 15 is a diagram illustrating RMS error as a function of the number of points for each tracked object for a simulated tracker and a simulated baseline.
FIG. 16 is a diagram illustrating RMS error as a function of distance to each tracked object for a simulated tracker and a simulated baseline.

In order to better understand the performance of the simulated tracker, the performance varies as a function of the number of observed points on the tracked object can be evaluated. The results are shown in FIG. 15 which illustrates RMS Error as a function of the number of points for each tracked object. As shown, the RMS error decreases as the number of tracked points increases, and the simulated ADH tracker outperforms the centroid-based Kalman filter baseline for any number of points. The two methods have similar performance when the number of points is small, since the ADH Tracker cannot take advantage of the 3D shape when there are not many visible points on the tracked object. As the number of visible points increases, the ADH Tracker is able to increase its tracking accuracy. The accuracy of the Kalman filter also improves as the number of points increases, probably due to the decreased occlusions for close objects which also have a large number of points. The difference in performance between the two methods shows the benefit of using the full 3D shape for varying numbers of observed points on the tracked object.

The RMS error as a function of the distance to the tracked object can similarly be computed, shown in FIG. 16 which illustrates RMS Error as a function of the distance to each tracked object. The simulated method consistently outperforms the centroid-based Kalman filter at all tracked distances. FIGS. 15 and 16 can also be used to predict the RMS error for each tracked object. For example, FIG. 16 shows the simulated RMS error is 0.15 m/s for nearby objects, and the error increases as the distance to the tracked object increases.

Figure 17:
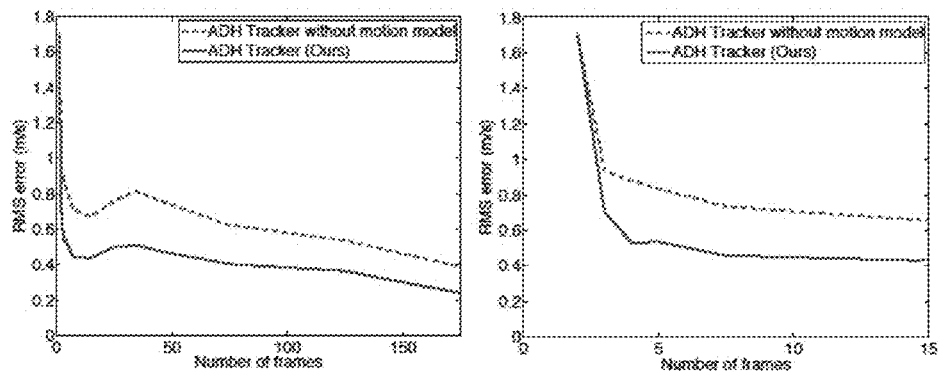
FIG. 17 is a diagram illustrating RMS error as a function of the number of frames for a simulated tracker.

Because of the motion model, the error of the method can be expected to decrease as the number of frames in which an object is seen increases, a better estimate of the prior motion of the tracked object can be obtained. This effect is shown in FIG. 17 which illustrates: Left: RMS Error as a function of the number of frames seen so far for each tracked object. This can be compared to the results of the simulated method with and without a motion model. Right: RMS Error as a function of the number of frames, viewed from 0 to 15 frames to more closely see the accuracy when initially tracking an object. Note that an object's velocity can only begin to be estimated after it can be seen for at least 2 frames.

FIG. 17 indicates that the simulated error is very large when an object is only seen for 3 or fewer frames. One explanation is that, before 4 frames have been observed, a good estimate of the objects past motion has not yet been obtained. After observing an object for at least 4 frames, the simulated motion model can be used to place a prior on the motion, thus reducing the error. Another possible explanation is that, when first observing an object, the object may initially be mostly occluded. After 4 frames, more of the object becomes visible, leading to better tracking.

These effects can be disambiguated by looking at the result of the simulated method with and without the use of a motion model, as shown in FIG. 17. When a motion model is not used, the only benefit of tracking an object for more frames is that more of the object will become visible. The difference between the two curves shows the benefit of using a motion model as the number of frames increases. As expected, for the first frame, the performance of the two methods is identical. After a few frames are observed, the tracker with a motion model significantly outperforms the version without a motion model.

Figure 18:
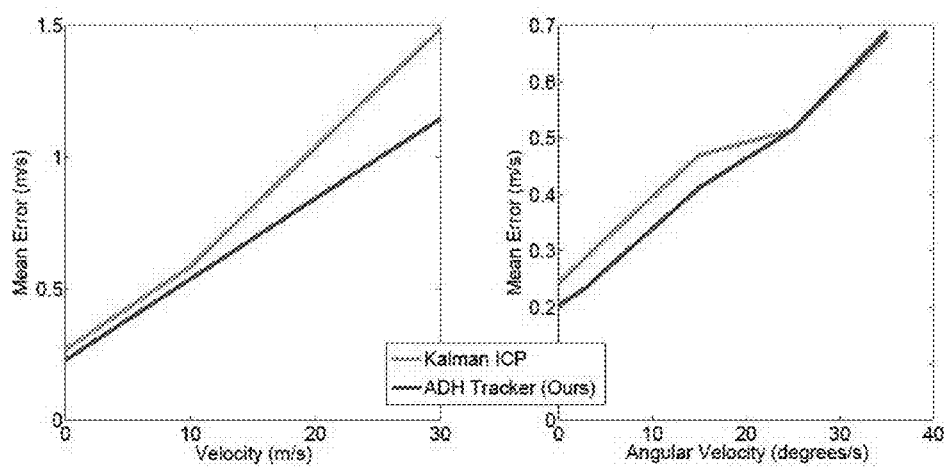
FIG. 18 is a diagram illustrating mean error as a function of the linear velocity and angular velocity of the simulated tracked object.

FIG. 18, illustrates mean error as a function of the linear velocity (left) or angular velocity (right) of the tracked object. The velocity of the tracked object affects the tracking accuracy. Faster objects can be more difficult to track accurately, due to the changing occlusions and viewpoints as the object moves. However, FIG. 18 shows that the simulated ADH tracker is more robust than simulated ICP for tracking fast-moving objects and outperforms ICP for all linear velocities. For objects with a large angular velocity, both methods perform similarly, but the ADH tracker excels when tracking objects with a small angular velocity. Most objects moving in an urban scene have a small angular velocity for the majority of their motion, so increasing the tracking accuracy for objects with small angular velocity is important. Both methods perform approximately the same for objects with a large angular velocity.

As discussed above, the mean of the posterior distribution will minimize the RMS error. It can be proven that the RMS error decreases by 7.5% if the mean of the distribution is used instead of the mode. In a multimodal distribution, the mode will select the single point with the highest probability. However, if two modes have similar probabilities, the mode will often be far from the ground-truth alignment. The mean, on the other hand, will consider both modes and choose an estimate in between them. As described above, using the mean typically minimize the RMS tracking error.

Figure 19:
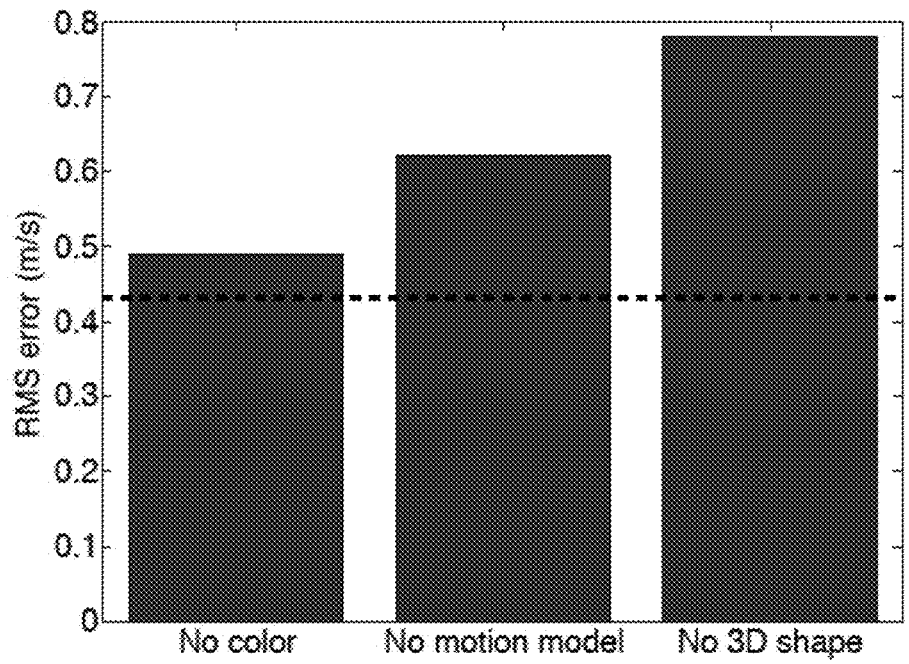
FIG. 19 is a diagram illustrating RMS error for different embodiments of a simulated ADH tracker.

The effect of different components of the system can be understood by looking at FIG. 19 which illustrates RMS Error for different versions of the simulated ADH tracker. The RMS error of the full ADH tracker is indicated by the black dashed line. Using the centroid instead of the full 3D shape would cause the biggest increase in error, shown by the bar on the right. Not using a motion model leads to the increase in error shown in the middle, and not using color leads to the increase in error shown on the left. The full method combines 3D shape, color, and a motion model for an RMS error of 0.43 m/s (on average across 515 tracked vehicles). Removing color causes the error to increase by 14% to 0.49 m/s. Removing the motion model causes the error to increase by 44% to 0.62 m/s. Removing the 3D shape (by using a centroid-based Kalman filter) causes the error to increase by 81% to 0.78 m/s. Thus, using the full 3D shape and a motion model are crucial for simulated accurate tracking.

In various embodiments, the different sources of error of the evaluation method used to determine the reliability of the simulated ground-truth data can be analyzed. First, by running SLAM on the dataset, it can be shown that the position estimate has an RMS error of 1.5 mm. Because the sensor has a framerate of 10 Hz, this equates to a velocity error of 0.015 m/s. Thus, the position error can account for less than 3.5% of the error of the method, which has an RMS error of 0.43 m/s when using color. The Velodyne LIDAR, on the other hand, has reported errors of less than 2 cm, which could account for 47% of the simulated total error. However, because the Velodyne has been calibrated, the expected actual error of the Velodyne measurements should be much less.

By looking at the mean velocity error, it can further be determined if there is a bias in the simulated velocity estimates. When tracking using color, the mean velocity error is −0.03 m/s, which is 5.6% of the total error. A completely unbiased tracker would have a mean velocity error of 0, when averaged over an infinite number of tracked objects. Based on the error analysis above, it can be concluded that, if the simulated method is biased, the bias is relatively small.

Figure 20:
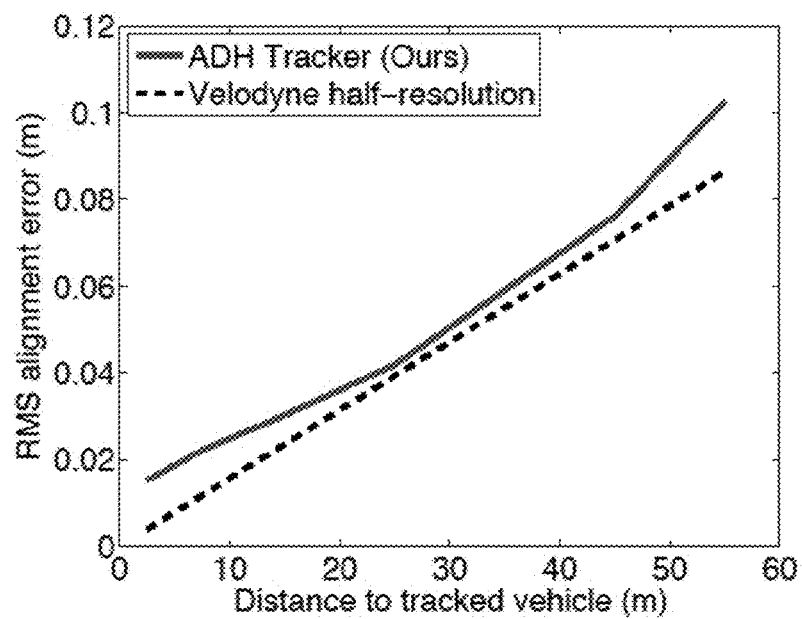
FIG. 20 is a diagram illustrating RMS error as a function of the distance to each simulated tracked object.

In numerous embodiments, it can be interesting to compare the error of the simulated method to the half-resolution of the sensor. The laser returns of the sensor becomes increasingly sparse as the distance to the tracked object increases. The resolution can be defined as the horizontal spacing between sensor measurements at a given distance. The half-resolution of the sensor can be shown in FIG. 20 which illustrates RMS error as a function of the distance to each tracked object, when tracking with color and the half-resolution of the 3D sensor. The simulated accuracy nearly matches the half-resolution of the sensor. By using a motion model, the simulated accuracy can potentially be improved below the half-resolution for objects that maintain a constant velocity. However, for objects that change their velocity in unpredictable ways, the half-resolution represents a limit on the potential accuracy of the method when using a 3D LIDAR for frame-to-frame tracking.

Although the present invention has been described in certain specific aspects, many additional modifications and variations would be apparent to those skilled in the art. It is therefore to be understood that the present invention can be practiced otherwise than specifically described without departing from the scope and spirit of the present invention including (but not limited to) estimating the velocity of multiple objects simultaneously and estimating the velocity for tracked objects in a wide variety of computing applications. Thus, embodiments of the present invention should be considered in all respects as illustrative and not restrictive. Accordingly, the scope of the invention should not be determined by the embodiments illustrated, but by the appended claims and their equivalents.

What is claimed is:

1. A tracker controller, comprising:
   a processor; and
   a memory containing:
      a velocity tracker application;
      a state space describing relationships between measured locations, calculated locations, and changes in locations, where the calculated locations in the state space correspond to unoccluded points on the surface of the tracked object;
   wherein the processor is directed by the velocity tracker application to:
      pre-process the state space to identify a tracked object;
      estimate a velocity of the tracked object using a location history calculated from the measured locations of the tracked object within the state space and a motion model calculated from the state space by:
         dividing the state space into a grid of cells where the grid of cells comprises a plurality of cells;
         calculating a probability that the tracked object is located in a given cell with respect to each cell in the plurality of cells;
         subdividing each cell in the plurality of cells having a probability that the tracked object is within the cell that satisfies a threshold into a plurality of subdivided cells; and
         returning the grid of cells and the probability that the tracked object is within each of the cells in the plurality of cells; and
      return the velocity of the tracked object.

2. The tracker controller of claim 1, wherein changes in locations in the state space are measures of changes in position relative to a last observation.

3. The tracker controller of claim 1, wherein the state space further comprises three-dimensional information.

4. The tracker controller of claim 1, wherein the state space further comprises two-dimensional information.

5. The tracker controller of claim 1, wherein the state space further comprises a Dynamic Bayesian Network.

6. The tracker controller of claim 5, wherein the measured locations in the Dynamic Bayesian Network are independent of previous measured locations and velocities and the changes in locations in the Dynamic Bayesian Network are measures of changes in position relative to a last observation.

7. The tracker controller of claim 1, wherein pre-processing the state space further comprises a point-cloud based segmentation process.

8. The tracker controller of claim 1, wherein estimating a velocity of a tracked object using the location history and the motion model further comprises an annealed dynamic histogram (ADH) process.

9. The tracker controller of claim 8, wherein the ADH process is adaptable based upon a desired runtime and a desired tracking resolution.

10. The tracker controller of claim 1, wherein the probability that the tracked object is in a given cell is evaluated using the location history.

11. The tracker controller of claim 10 wherein the location history is evaluated using the following expression:

$$p(z_t \mid x_t, z_{t-1}) = \eta \left( \prod_{z_j \in z_t} \exp\left(-\frac{1}{2}(z_j - \bar{z}_i)^T \Sigma^{-1}(z_j - \bar{z}_i)\right) + k \right)$$

where t, i, and j indicate positions in the state space, z is the measured location, x is the change in location, η is a constant, and k is a smoothing term.

12. The tracker controller of claim 10 wherein the location history further comprises optional color channel information and is evaluated using the following expression:

$$p(z_t \mid x_t, z_{t-1}) = \\ \eta \left( \prod_{z_j \in z_t} p_s(z_j \mid x_t, z_{t-1}) p_c(z_j \mid x_t, z_{t-1}, V) + k_3(k_4 - p_s(z_j \mid x_t, z_{t-1})) \right)$$

Where t, i, and j indicate positions in the state space, z is the measured location, x is the change in location, η is a constant, k is a smoothing term, $p_s$ is the probability of a spatial match, $p_c$ is the probability of a color match, and p(V) is the prior probability of sampling from a previously visible surface.

13. The tracker controller of claim 1, wherein the probability that the tracked object is in a given cell is evaluated using the motion model.

14. The tracker controller of claim 13 wherein the motion model is evaluated using the following expression: $p(\hat{x}_{t,i} \mid z_1 \ldots z_{t-1})$, where t and i indicate positions in the state space, z is the measured location, x is the change in location.

15. The tracker controller of claim 1, wherein the threshold is determined by a KL-divergence.

16. The tracker controller of claim 1, wherein a number of the plurality of subdivided cells is evaluated using the following expression: $k=3^d$, where d is the number of dimensions.

17. The tracker controller of claim 1, wherein the measurement model is evaluated using a kd-tree for the nearest-neighbor for each point.

18. The tracker controller of claim 1, wherein the measurement model is evaluated using a pre-caching process to pre-cache the probability that a tracked object is within a cell in the plurality of cells.

19. The tracker controller of claim 1, wherein measured locations compares two frames with a smaller and a larger set of points by tracking from the frame with the smaller set of points to the frame with the larger set of points.

20. The tracker controller of claim 1, wherein the measurement model is evaluated using a combination of a kd-tree for the nearest-neighbor for each point and a pre-caching process to pre-cache the probability that a tracked object is within a cell in the plurality of cells.

* * * * *